United States Patent
Saito et al.

(10) Patent No.: US 8,701,387 B2
(45) Date of Patent: Apr. 22, 2014

(54) EXHAUST GAS TREATMENT DEVICE

(75) Inventors: Tomoyuki Saito, Kasumigaura (JP); Eri Saijo, Kasumigaura (JP); Toshihiro Abe, Tsukuba (JP); Hiroyuki Kamata, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 324 days.

(21) Appl. No.: 12/996,879

(22) PCT Filed: Aug. 18, 2009

(86) PCT No.: PCT/JP2009/064445
§ 371 (c)(1),
(2), (4) Date: Dec. 8, 2010

(87) PCT Pub. No.: WO2010/055717
PCT Pub. Date: May 20, 2010

(65) Prior Publication Data
US 2011/0120085 A1 May 26, 2011

(30) Foreign Application Priority Data
Nov. 11, 2008 (JP) .................................. 2008-288729

(51) Int. Cl.
*F01N 1/00* (2006.01)
(52) U.S. Cl.
USPC .................. 60/272; 60/295; 60/299; 55/523; 422/177; 422/180
(58) Field of Classification Search
USPC ............. 60/272, 280, 295, 299, 300; 55/523; 422/177, 180
See application file for complete search history.

(56) References Cited

U.S. PATENT DOCUMENTS

| | | | |
|---|---|---|---|
| 4,050,703 A * | 9/1977 | Tuvesson et al. | 277/615 |
| 7,501,005 B2 * | 3/2009 | Thaler | 55/523 |
| 7,779,961 B2 * | 8/2010 | Matte | 181/227 |
| 2001/0018827 A1 * | 9/2001 | Rhode et al. | 60/312 |
| 2006/0191246 A1 | 8/2006 | Sellers et al. | |
| 2007/0169452 A1 * | 7/2007 | Grimm et al. | 55/523 |

FOREIGN PATENT DOCUMENTS

| | | |
|---|---|---|
| JP | 64-039417 U | 9/1989 |
| JP | 8-100643 A | 4/1996 |
| JP | 8-103665 A | 4/1996 |
| JP | 2003-120277 A | 4/2003 |
| JP | 2005-344580 A | 12/2005 |
| JP | 2006-239683 A | 9/2006 |
| JP | 2007-192328 A | 8/2007 |

* cited by examiner

Primary Examiner — Binh Q Tran
(74) Attorney, Agent, or Firm — Mattingly & Malur, PC

(57) ABSTRACT

An engaging groove (47) with which a gasket (42) is engaged is provided in each of a front side projecting portion (44) and a rear side projecting portion (46) formed in a filter accommodating cylinder (37) to be positioned on an outer peripheral surface (44A, 46A) of each projecting portion (44, 46). Therefore, when the gasket (42) latches on each of the projecting portion (44; 46) to be fitted thereon from an outside, the gasket (42) can be engaged with the engaging groove (47) provided in each of the projecting portions (44, 46). In consequence, at the time of mounting and removing the filter accommodating cylinder (37), the falling-off of the gasket (42) can be prevented, and, for example, an inspection operation, a cleaning operation and the like of an accommodated particulate matter removing filter (41) can be easily performed.

2 Claims, 16 Drawing Sheets

EXHAUST GAS TREATMENT DEVICE

TECHNICAL FIELD

The present invention relates to an exhaust gas treatment device which is suitably used for reducing exhaust noise of exhaust gas emitted from, for example, an engine, and for removing harmful substances contained in the exhaust gas.

BACKGROUND ART

Generally, a construction machine such as a hydraulic excavator is constituted by an automotive lower traveling structure, an upper revolving structure which is swingably mounted on the lower traveling structure, and a working mechanism liftably mounted on the front side of the upper revolving structure. The upper revolving structure has an engine mounted on the rear side of a revolving frame to drive a hydraulic pump, and has a cab, a fuel tank, an operating oil tank, and the like mounted on the front side of the revolving frame.

Generally, a diesel engine is used as the engine of a hydraulic excavator. It is known that the diesel engine emits harmful substances such as particulate matter (PM) and nitrogen oxides (NOx), and the like. Accordingly, the hydraulic excavator is so constructed as to be provided with an exhaust gas treatment device in an exhaust pipe for forming an exhaust gas passage of the engine.

This exhaust gas treatment device has treatment members such as a particulate matter removing filter (which is generally called a diesel particulate filter and is hereinafter abbreviated as "DPF") for capturing and removing the particulate matter in the exhaust gas, a selective reduction catalyst which purifies nitrogen oxides (NOx) by use of a urea water solution, and an oxidation catalyst for oxidizing and removing carbon monoxide (CO) and hydrocarbons (HC) (Patent Literature 1: Japanese Patent Laid-Open No. 2003-120277 A).

Here, the exhaust gas treatment device according to Patent Literature 1 is comprised of, for example, an upstream cylinder disposed on an upstream side in the flowing direction of exhaust gas of an engine, a downstream cylinder disposed on the downstream side, and a purifying part cylinder provided in series between these cylinders, and treatment members including DPF, a selective reduction catalyst, an oxidation catalyst, and the like, are accommodated in this purifying part cylinder. The upstream cylinder, the purifying part cylinder and the downstream cylinder have flanges at end portions opposing with each other, for example, and are connected in series in a state of sandwiching a gasket between the respective flanges for improving air-tightness therebetween.

Further, connecting portions opposing with each other are formed between the upstream cylinder and the purifying part cylinder and connecting portions opposing with each other are formed between the downstream cylinder and the purifying part cylinder. For example, the connecting portion of the upstream cylinder and the connecting portion of the downstream cylinder are formed of flanges, and each of the connecting portions opposing these flanges and disposed at both the ends of the purifying part cylinder respectively is formed of a flange and a projecting portion projecting from a position of the flange and inserted and fitted into the upstream cylinder and the downstream cylinder.

Incidentally, in the exhaust gas treatment device according to Patent Literature 1, the gasket is disposed to face the flange on the periphery of the projecting portion provided at each of both ends of the purifying part cylinder at the time of mounting and removing the purifying part cylinder to or from the upstream cylinder and the downstream cylinder. In this case, when the purifying part cylinder is inclined at the mounting and removing, the gasket slides down from the projecting portion downwardly inclined. Therefore, labors are required for the mounting and removing operation of the purifying part cylinder to or from the upstream cylinder and the downstream cylinder, raising a problem that an operational efficiency of an inspection operation, a cleaning operation or the like is degraded.

SUMMARY OF THE INVENTION

In view of the above-discussed problems with the conventional art, it is an object of the present invention to provide an exhaust gas treatment device which can facilitate a mounting and removing operation of a purifying part cylinder to or from an upstream cylinder and a downstream cylinder by preventing a gasket latching on a projecting portion provided in the cylinder from sliding down.

(1) An exhaust gas treatment device according to the present invention comprises an upstream cylinder provided on an upstream side of an exhaust gas passage of an engine mounted on a vehicle body; a downstream cylinder provided on a downstream side of the upstream cylinder; a purifying part cylinder which is provided between the upstream cylinder and the downstream cylinder by being connected in series with each other and accommodating a treatment member therein for purifying an exhaust gas; and circular gaskets provided respectively between the upstream cylinder and the purifying part cylinder and between the downstream cylinder and the purifying part cylinder; wherein among connecting portions opposing with each other between the upstream cylinder and the purifying part cylinder and/or between the downstream cylinder and the purifying part cylinder, the connecting portion of one cylinder is formed of a flange and the connecting portion of the other cylinder is formed of the flange and a projecting portion projecting from a position of the flange to be inserted and fitted into the one cylinder.

To overcome the above-described problems, the feature of the construction adopted by the present invention lies in that an engaging portion, with which the gasket is engaged, is provided in the projecting portion of the other cylinder to be positioned on an outer peripheral surface of the projecting portion.

With this construction, when the gasket latches on the projecting portion of the other cylinder, the gasket is engaged with the engaging portion provided in the projecting portion. Therefore, even when the other cylinder is inclined, the engaging portion can prevent the gasket from falling off. As a result, for example, since the purifying part cylinder can be easily mounted and removed to and from the upstream cylinder and the downstream cylinder, it is possible to improve an operational efficiency of an inspection operation, a cleaning operation or the like to the accommodated treatment members.

(2) Further, the present invention comprises a support member provided in the vehicle body side for supporting the upstream cylinder and the downstream cylinder; placing legs provided on the upstream cylinder and the downstream cylinder respectively to be mounted on the support member; and a cylinder moving mechanism provided between the support member and the placing leg for axially moving the upstream cylinder and/or the downstream cylinder at the time of mounting and removing the purifying part cylinder, wherein the projecting portion of the other cylinder is inserted and fitted to or is disengaged from the one cylinder by the cylinder moving mechanism.

With this construction, when the purifying part cylinder is mounted to or removed from the upstream cylinder and the downstream cylinder, at least one of the upstream cylinder and the downstream cylinder can be axially moved by the cylinder moving mechanism to change an axial interval between the upstream cylinder and the downstream cylinder.

Accordingly, for example, at the time of removing the purifying part cylinder connected between the upstream cylinder and the downstream cylinder, the interval between the upstream cylinder and the downstream cylinder is made larger than an axial dimension of the purifying part cylinder, and therefore the purifying part cylinder can be easily removed by pulling the projecting portion of the other cylinder out of the one cylinder. On the other hand, at the time of mounting the purifying part cylinder between the upstream cylinder and the downstream cylinder, after disposing the purifying part cylinder between the upstream cylinder and the downstream cylinder in a state where the interval between the upstream cylinder and the downstream cylinder is made larger than the axial dimension of the purifying part cylinder, the interval between the upstream cylinder and the downstream cylinder is made smaller and the projecting portion of the other cylinder is inserted into the one cylinder. Thereby the purifying part cylinder can be easily mounted between the upstream cylinder and the downstream cylinder.

In this way, the cylinder moving mechanism can change the axial interval between the upstream cylinder and the downstream cylinder without removing the placing leg from the support member to easily perform the inspection operation, the cleaning operation and the like of the treatment members accommodated in the purifying part cylinder.

(3) In addition, according to the present invention, the engaging portion is a recessed groove extending in a circumferential direction at an axial intermediate position of the projecting portion, and an inclined surface portion is provided in the recessed groove to be positioned at the flange side.

According to this construction, when the projecting portion of the other cylinder is inserted and fitted into the opponent cylinder in a state where the gasket is engaged with the recessed groove, the gasket is pushed to move to the flange side. At this time, the gasket can automatically move to a predetermined position on an outer peripheral surface of the projecting portion by the inclined surface portion of the recessed groove. In consequence, since it is not necessary to perform an operation of lifting the gasket, which goes down by an engaging amount by which the gasket is engaged with the recessed groove, by hand at the time of connecting the flanges of the respective cylinders, it is possible to more simply perform the mounting and removing operation of the purifying part cylinder to and from the upstream cylinder and the downstream cylinder.

BRIEF DESCRIPTION OF THE DRAWINGS

In the accompanying drawings:

FIG. 8 is an exploded perspective view illustrating the upstream cylinder, a downstream cylinder, a filter accommodating cylinder, a cylinder moving mechanism, gaskets and the like;

DESCRIPTION OF REFERENCE NUMERALS

Figure 1:
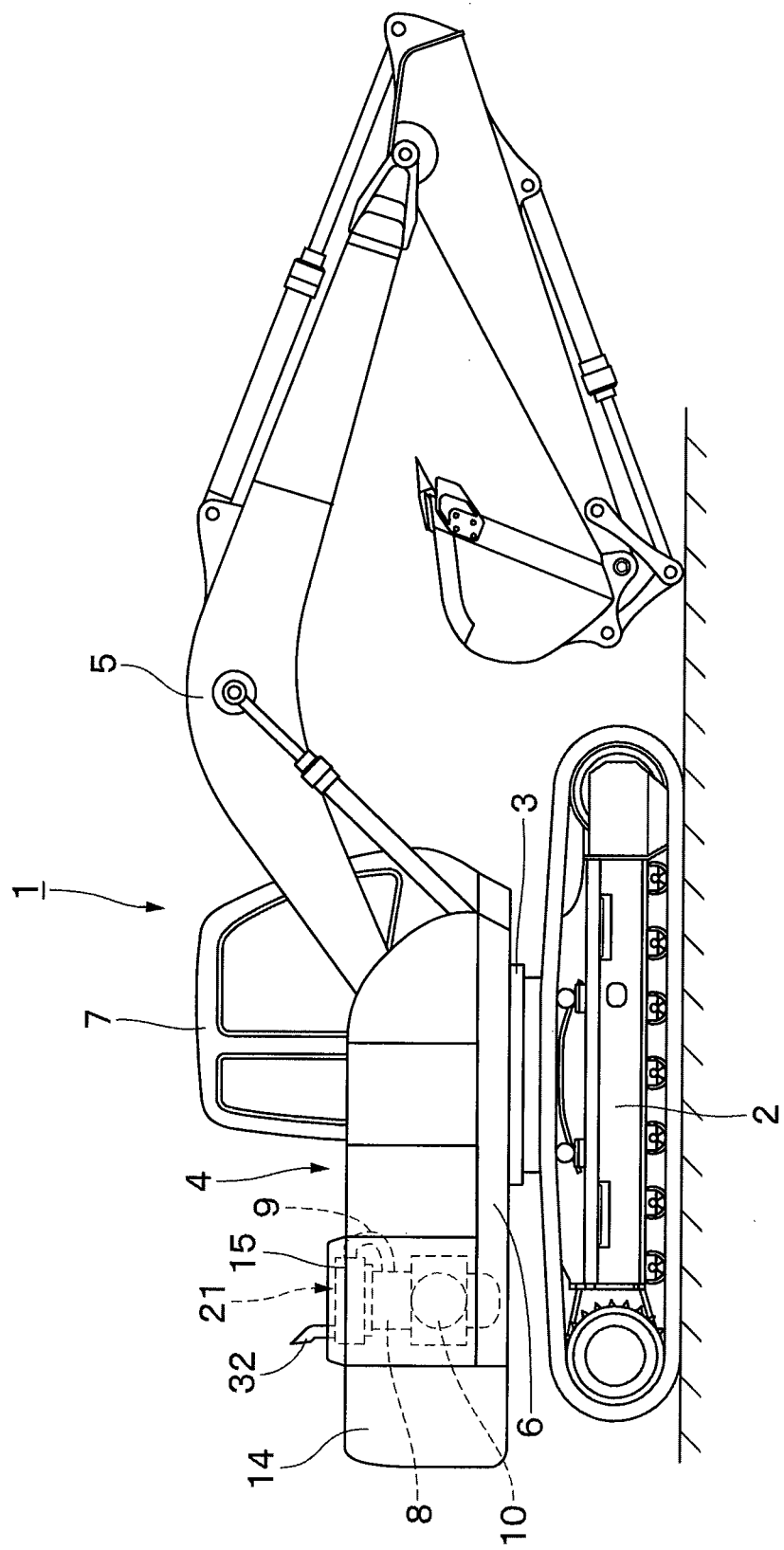
FIG. 1 is a front view illustrating a hydraulic excavator applied to a first embodiment of the present invention.

1: Hydraulic excavator
2: Lower traveling structure (vehicle body)
4: Upper revolving structure (vehicle body)
8: Engine
9: Exhaust pipe (Exhaust gas passage)
16: Treatment device supporting bracket (support member)
21, 51, 61: Exhaust gas treatment device
22, 52, 62: Upstream cylinder
22A, 30A: Connecting portion
23, 31, 38, 23', 38': Cylindrical case
23A, 31A, 38A: Cylindrical portion
23B, 31B: Lid portion
23C, 31C, 23C', 38B': Flange portion
24: Inlet pipe
25: Oxidation catalyst (treatment member)
26, 33: Placing leg
27, 34: Cylinder moving mechanism
30, 53, 63: Downstream cylinder
32: Outlet pipe
37, 54, 64: Filter accommodating cylinder (purifying part cylinder)

37A: Upstream side connecting portion
37B: Downstream side connecting portion
38B: Front side flange portion
38C: Rear side flange portion
41: Particulate matter removing filter (treatment member)
42: Gasket
43, 45: Opening portion
44: Front side projecting portion
46: Rear side projecting portion
47, 59, 71, 81: Engaging groove (engaging portion)
47A: Groove portion
47B: Inclined surface portion
47C: Vertical surface portion
55, 57: Projecting portion
56: Front side opening portion
58: Rear side opening portion

MODE OF CARRYING OUT THE INVENTION

Hereinafter, the embodiments of an exhaust gas treatment device in accordance with the present invention is described more particularly with reference to the accompanying drawings, by citing as an example a case where the exhaust gas treatment device is applied to a hydraulic excavator.

FIGS. 1 to 15 show a first embodiment of the present invention. In this embodiment, a particulate matter removing device (PM removing device) for removing by a particulate matter removing filter (DPF) particulate matter (PM) emitted from an engine is illustrated as an example of the exhaust gas treatment device.

The exhaust gas treatment device used in the first embodiment is constructed such that three cylinders, namely, an upstream cylinder with oxidation catalyst and a muffler cylinder accommodated therein, a downstream cylinder with a muffler cylinder accommodated therein, and a filter accommodating cylinder with the DPF accommodated therein, are connected together in series in the axial direction by use of bolts, and are mounted to the vehicle body side by means of a placing leg.

In FIG. 1, designated at 1 is a hydraulic excavator as a typical example of construction machines which constitutes a vehicle body to which the present embodiment is applied. The hydraulic excavator 1 is largely constituted by a crawler type automotive lower traveling structure 2, an upper revolving structure 4 which is swingably mounted on the lower traveling structure 2 through a revolving apparatus 3 and constitutes a vehicle body together with the lower traveling structure 2, and a working mechanism 5 liftably mounted on a front portion of the upper revolving structure 4 for performing an excavating operation or the like. The upper revolving structure 4 is constituted by a revolving frame 6, a cab 7, an engine 8, an exhaust gas treatment device 21, which will be described hereinafter, and the like.

Figure 2:
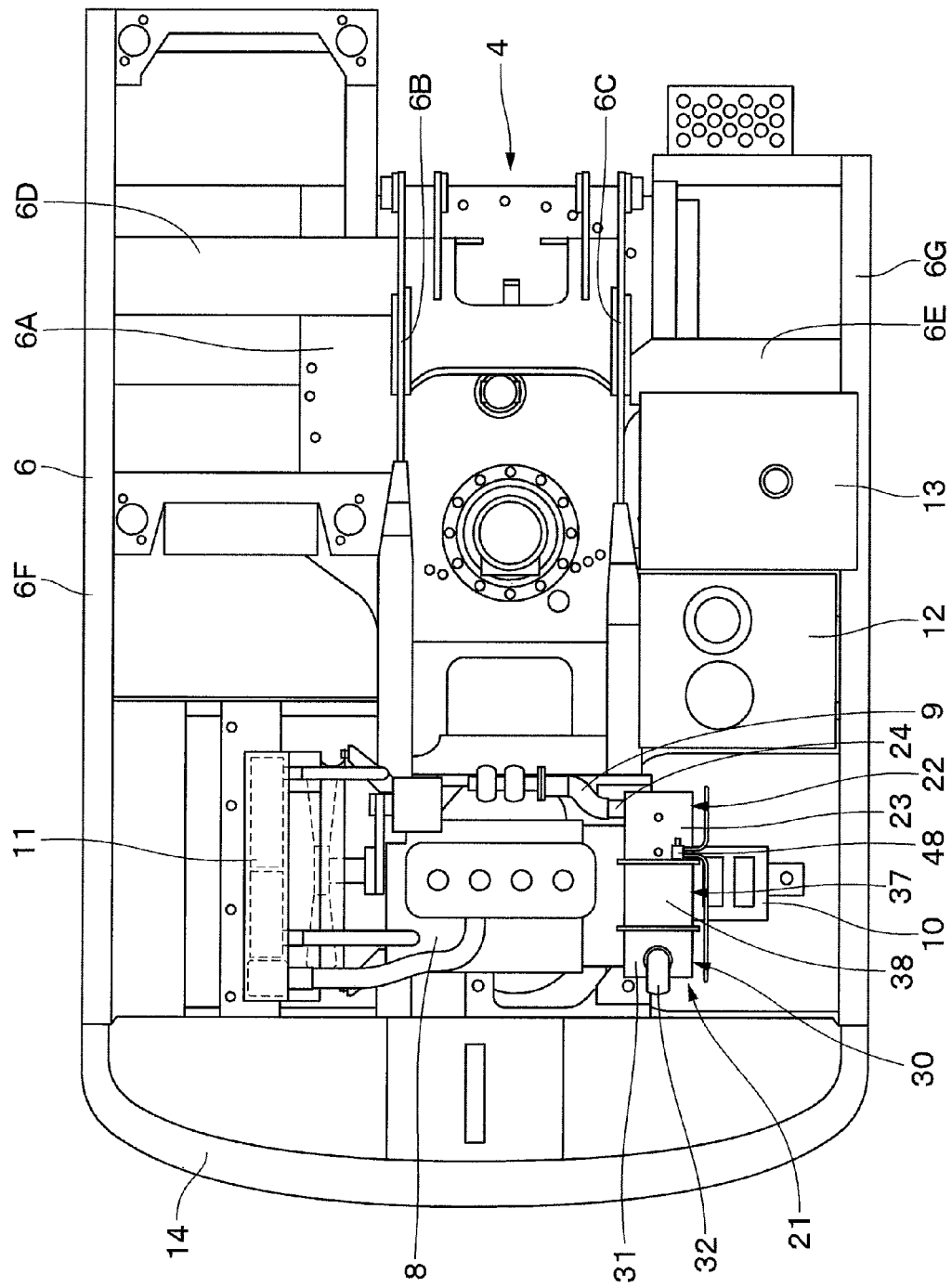
FIG. 2 is a plan view illustrating in enlarged form an upper revolving structure with a cab and a housing cover omitted.

Denoted at 6 is the revolving frame as a base of the upper revolving structure 4. The revolving frame 6 constitutes a rigid supporting structure and is mounted on the lower traveling structure 2 through the revolving apparatus 3. Here, as shown in FIG. 2, the revolving frame 6 is largely constituted by a thick-walled bottom plate 6A extending in the front and rear directions, a left vertical plate 6B and a right vertical plate 6C erected on the bottom plate 6A and extending in the front and rear directions with a predetermined interval therebetween in the left and right directions, a plurality of left extension beams 6D extending from the left vertical plate 6B in the left direction, a plurality of right extension beams 6E extending from the right vertical plate 6C in the right direction, a left side frame 6F secured to distal ends of each left extension beam 6D and extending in the front and rear directions, and a right side frame 6G secured to distal ends of each right extension beam 6E and extending in the front and rear directions.

Indicated at 7 is the cab (see FIG. 1) which is mounted on the left front side of the revolving frame 6, and the cab 7 constitutes an operator's operation room. A driver's seat on which the operator is to be seated, various operation levers (none are shown), and the like are disposed inside the cab 7.

Denoted at 8 is the engine which is mounted on the rear side of the revolving frame 6 in a transversely mounted state. The engine 8 is constituted by a diesel engine, for example. As shown in FIG. 2, an exhaust pipe 9, which constitutes a portion of an exhaust gas passage for emitting exhaust gas, is provided on the right side of the engine 8, and the exhaust gas treatment device 21 to be described later is mounted at an intermediate portion of the exhaust pipe 9.

The engine 8 is highly efficient and excels in durability, and yet undesirably emits harmful substances such as particulate matter (PM), nitrogen oxides (NOx), and carbon monoxide (CO) together with the exhaust gas. Therefore, the exhaust gas treatment device 21 which is mounted on the exhaust pipe 9 is comprised of an oxidation catalyst 25 for oxidizing and removing carbon monoxide (CO) and the like and a DPF 41 for capturing and removing particulate matter, as will be described hereinafter.

Figure 3:
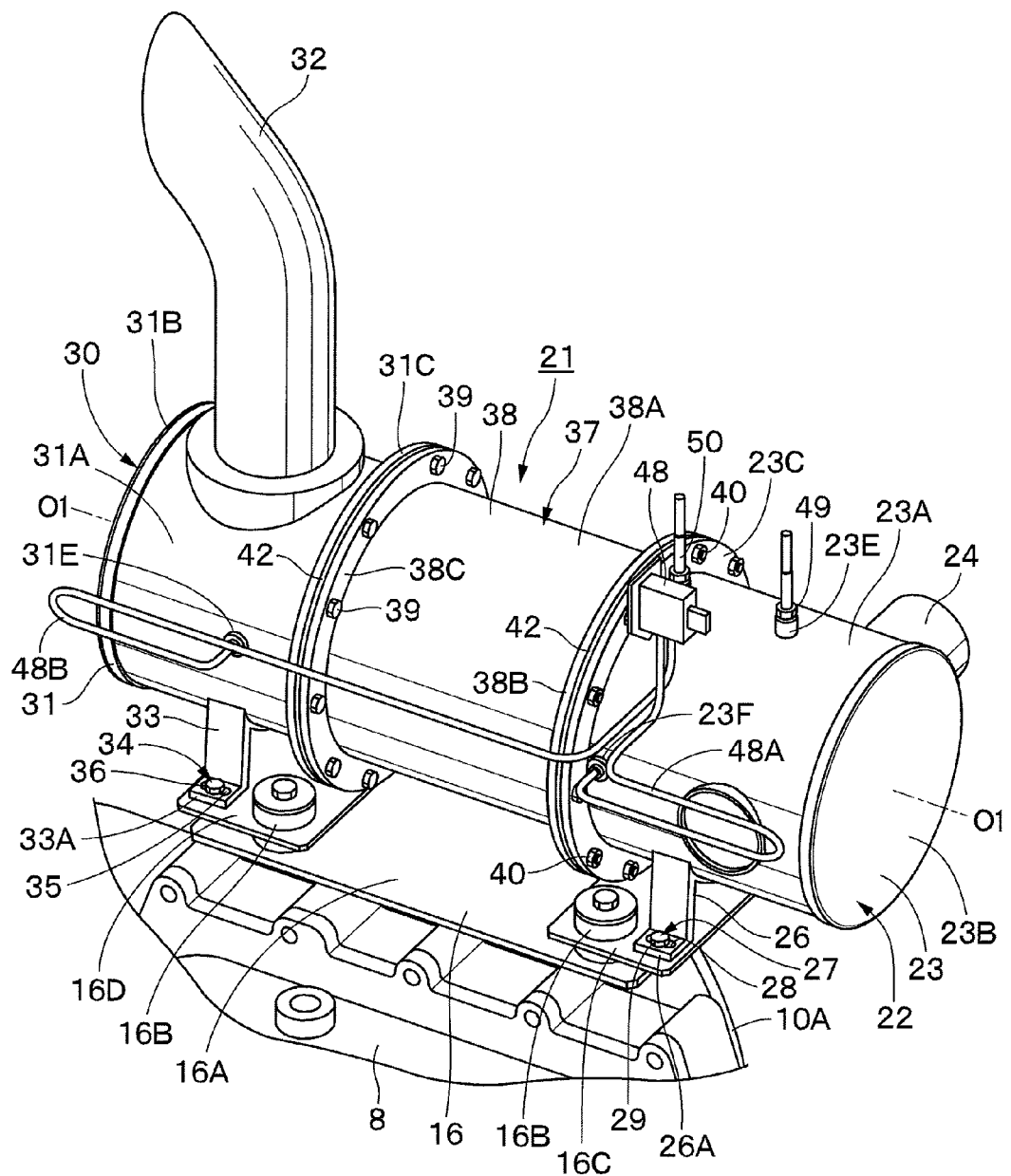
FIG. 3 is an enlarged perspective view of essential portions of FIG. 1 illustrating an exhaust gas treatment device as mounted on an engine.

Denoted at 10 is a hydraulic pump mounted on the right side of the engine 8. The hydraulic pump 10 is driven by the engine 8 to thereby deliver working pressure oil to various hydraulic actuators mounted on the hydraulic excavator 1. As shown in FIG. 3, as for the hydraulic pump 10, a left end portion opposing the engine 8 serves as a flange portion 10A, and the flange portion 10A is bolted to the engine 8. In addition, at the time of mounting the flange portion 10A of the hydraulic pump 10 to the engine 8, a treatment device supporting bracket 16 to be described later is designed to be mounted together.

Indicated at 11 is a heat exchanger (see FIG. 2) provided to be positioned at the left side of the engine 8. The heat exchanger 11 is constituted by, for example, a radiator, an oil cooler, an intercooler and the like. The heat exchanger 11 radiates the heat of a coolant into a cooling air which is supplied during the operation of the engine 8 to cool engine cooling water, operating oil and supercharged air.

Indicated at 12 is an operating oil tank mounted on the right side of the revolving frame 6 to be positioned at the front side of the hydraulic pump 10. The operating oil tank 12 stores operating oil to be supplied to the hydraulic pump 10. Indicated at 13 is a fuel tank provided on the front side of the operating oil tank 12. The fuel tank 13 stores therein fuel to be supplied to the engine 8.

Indicated at 14 is a counterweight mounted on the rear end portion of the revolving frame 6 to be positioned at the rear side of the engine 8. The counterweight 14 is for keeping a weight balance with the working mechanism 5. Indicated at 15 is a housing cover disposed on the front side of the counterweight 14. The housing cover 15 accommodates the engine 8, the hydraulic pump 10, the heat exchanger 11 and the like therein.

Figure 4:
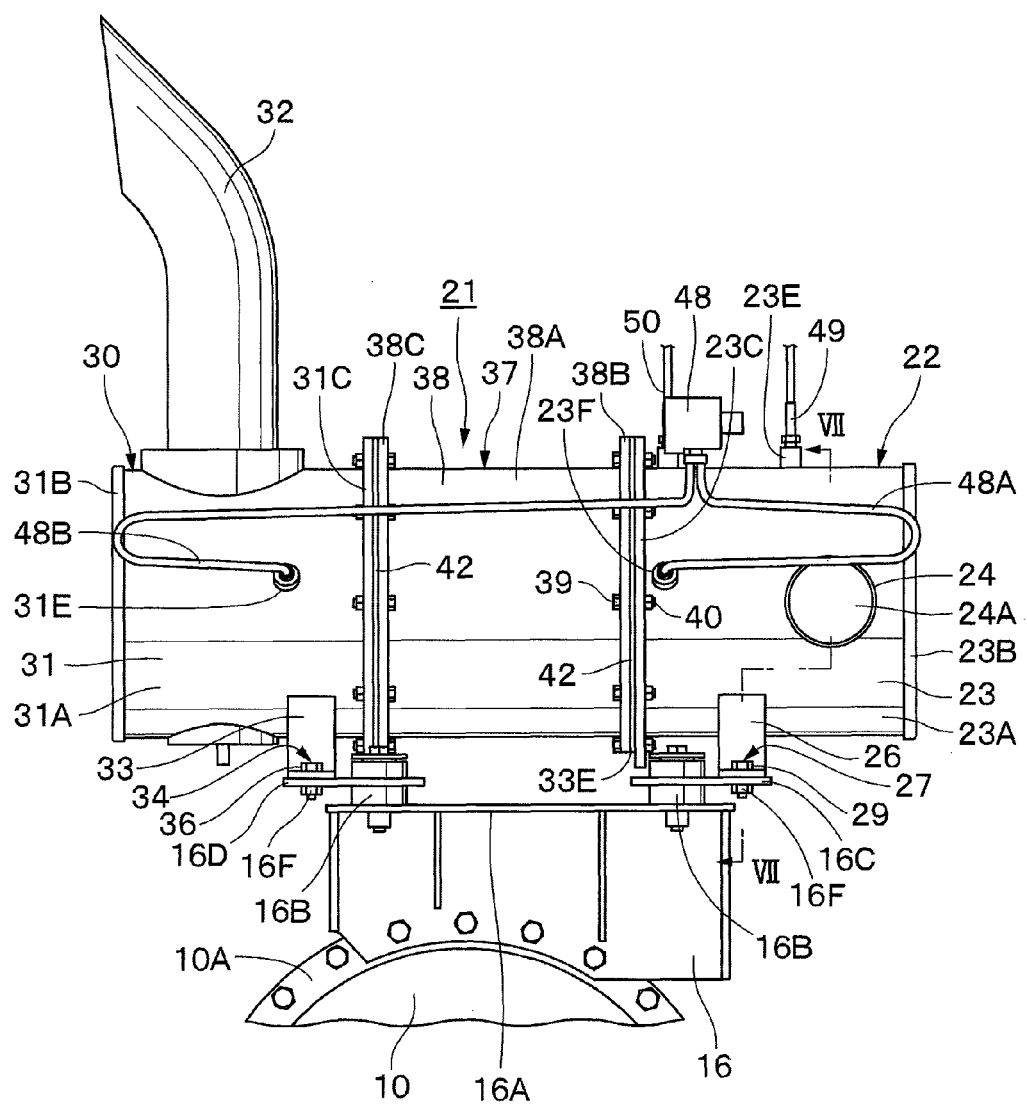
FIG. 4 is a front view illustrating the exhaust gas treatment device together with a hydraulic pump.

Denoted at 16 is the treatment device supporting bracket provided to be positioned at the right side of the engine 8. The treatment device supporting bracket 16 constitutes a support member at the vehicle body side (upper revolving structure 4 side) for supporting the exhaust gas treatment device 21 to be described later. As shown in FIGS. 3 and 4, the treatment device supporting bracket 16 is largely constituted by a support base 16A mounted on the engine 8 together with the flange portion 10A of the hydraulic pump 10, and a front side mounting plate 16C and a rear side mounting plate 16D arranged on the support base 16A at an interval in a front and rear directions and supported in a vibration isolated manner through a plurality of vibration isolating members 16B (only two are shown).

Figure 7:
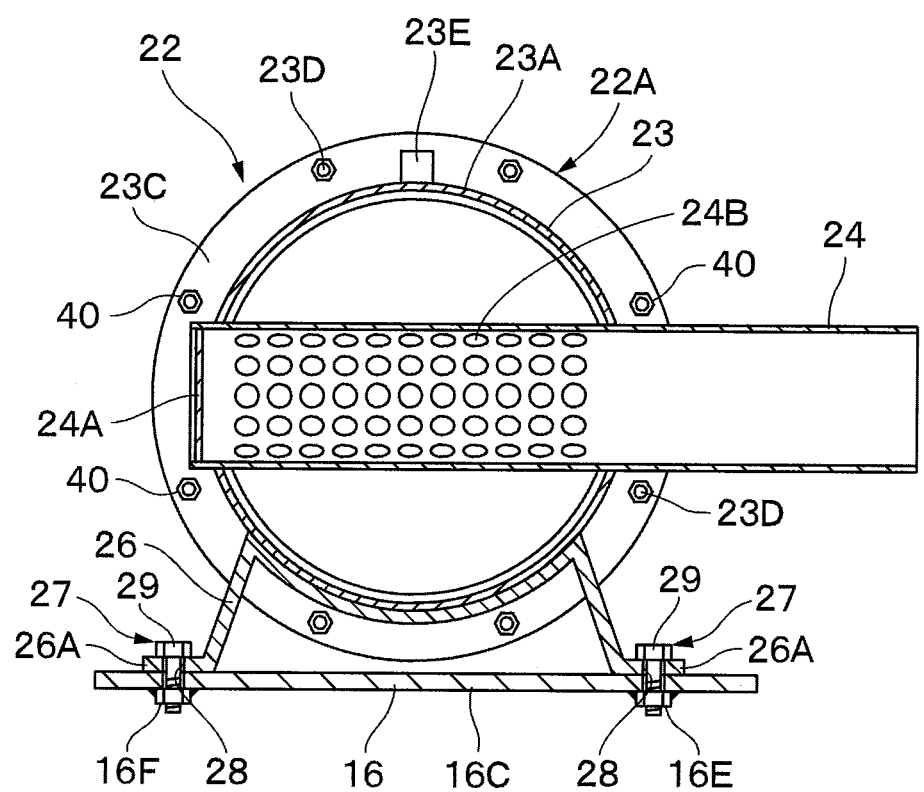
FIG. 7 is an enlarged cross-sectional view of essential portions, taken from a direction of arrows VII-VII in FIG. 4, of a state in which an upstream cylinder is mounted on a purifying device supporting bracket.

In addition, as shown in FIG. 7, left and right bolt passage holes 16E, into which bolts 29 to be described later are inserted, are formed in the front side mounting plate 16C, and left and right bolt passage holes (not shown), into which bolts 36 to be described later are inserted, are formed in the rear side mounting plate 16D. Back nuts 16F corresponding to the four bolt passage holes 16E are secured to the back surface side of the front side mounting plate 16C.

Next, the exhaust gas treatment device for purifying an exhaust gas emitted from the engine 8 will be explained.

Designated at 21 is the exhaust gas treatment device located on the upper right side of the engine 8 and connected to the exhaust pipe 9. The exhaust gas treatment device 21 constitutes an exhaust gas passage together with the exhaust pipe 9 and removes harmful substances contained in the exhaust gas during a period where the exhaust gas flows from the upstream side to the downstream side of the exhaust gas passage. The exhaust gas treatment device 21 is disposed in a longitudinally mounted state in which it extends in the front and rear directions above the engine 8 so as to set its front side as an upstream side and a rear side as a downstream side in a front and rear directions (see FIG. 2).

Figure 5:
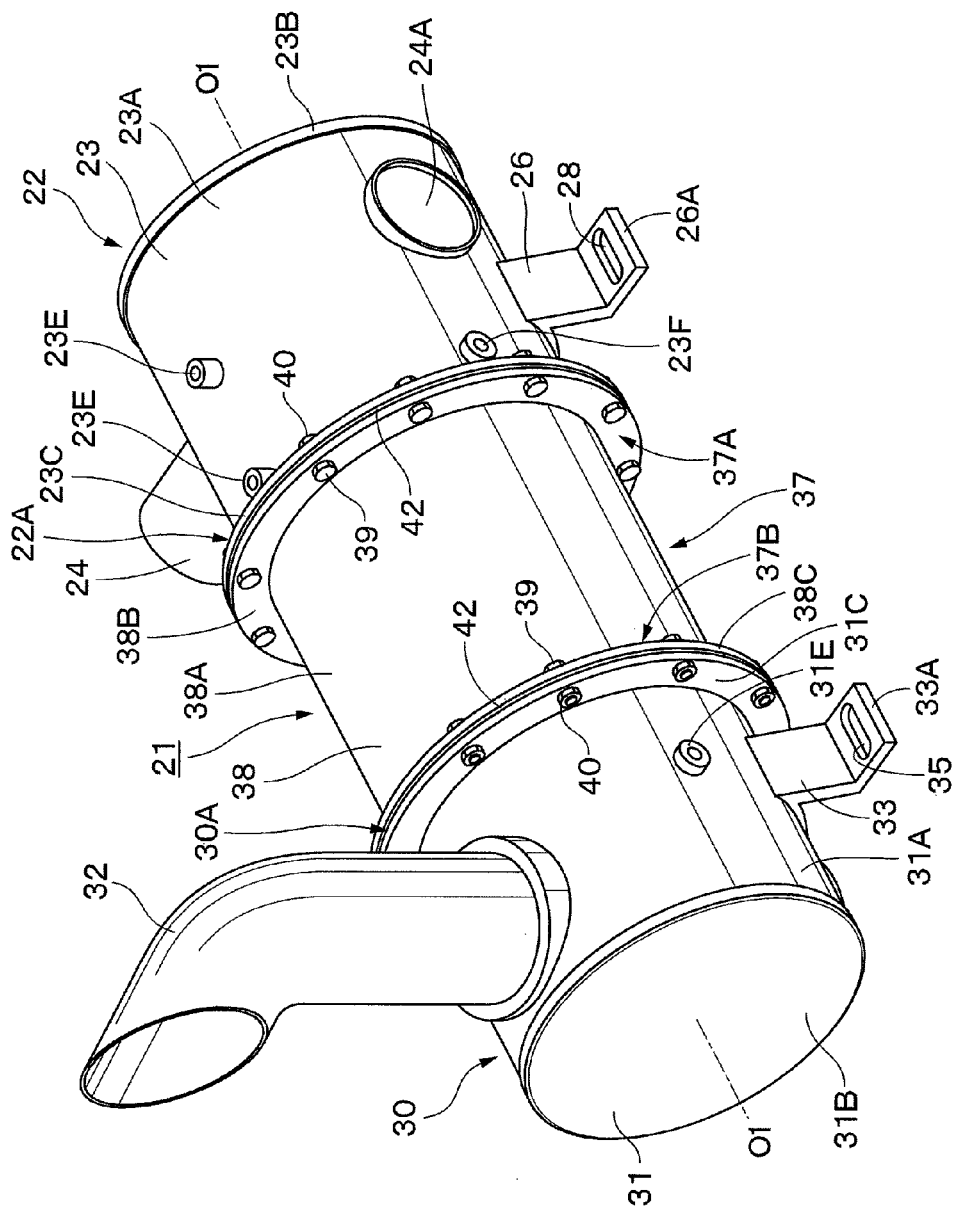
FIG. 5 is a perspective view illustrating the exhaust gas treatment device as a single unit as viewed from a position different from FIG. 3.
Figure 6:
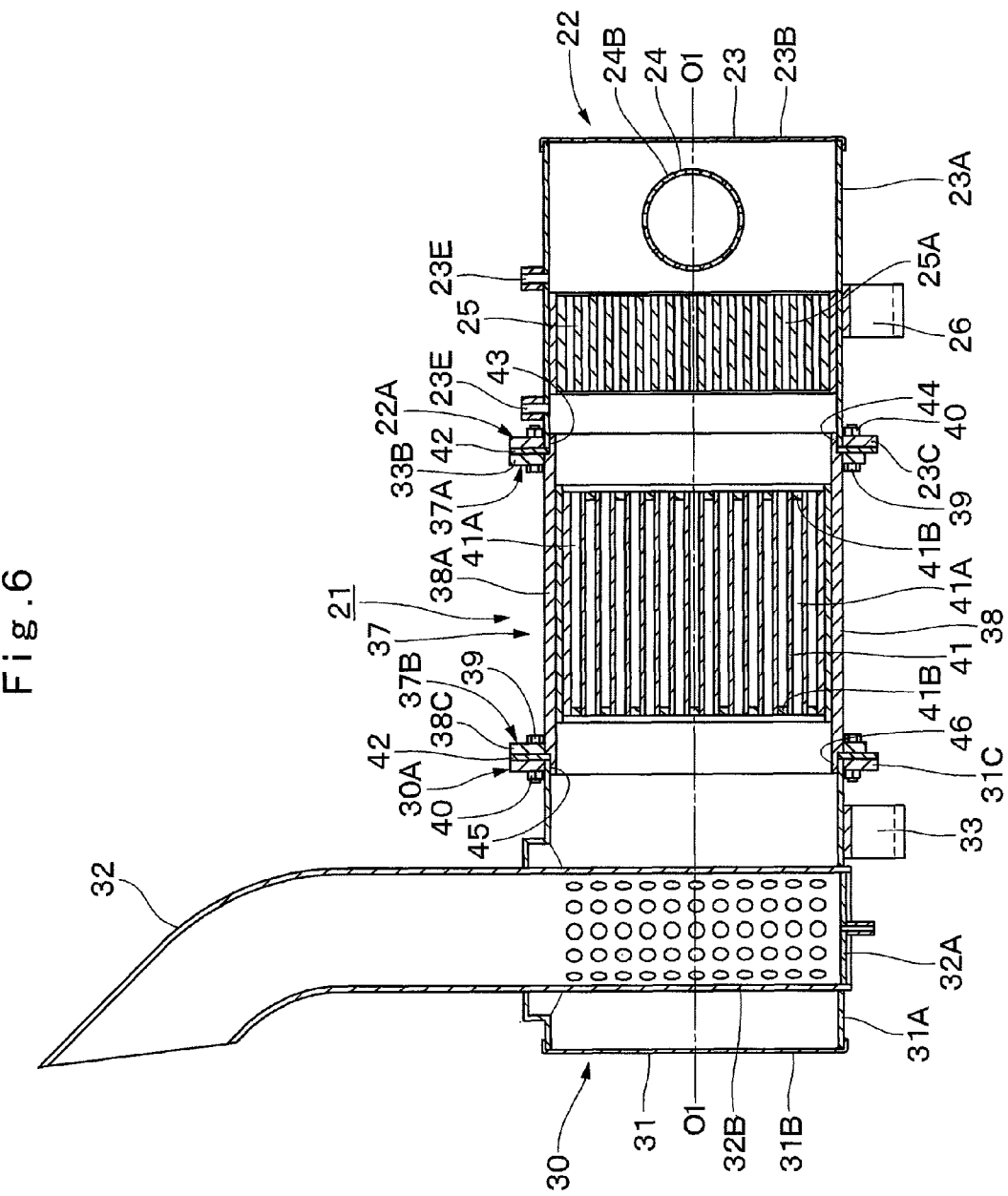
FIG. 6 is a longitudinal sectional view illustrating an internal structure of the exhaust gas treatment device.
Figure 8:
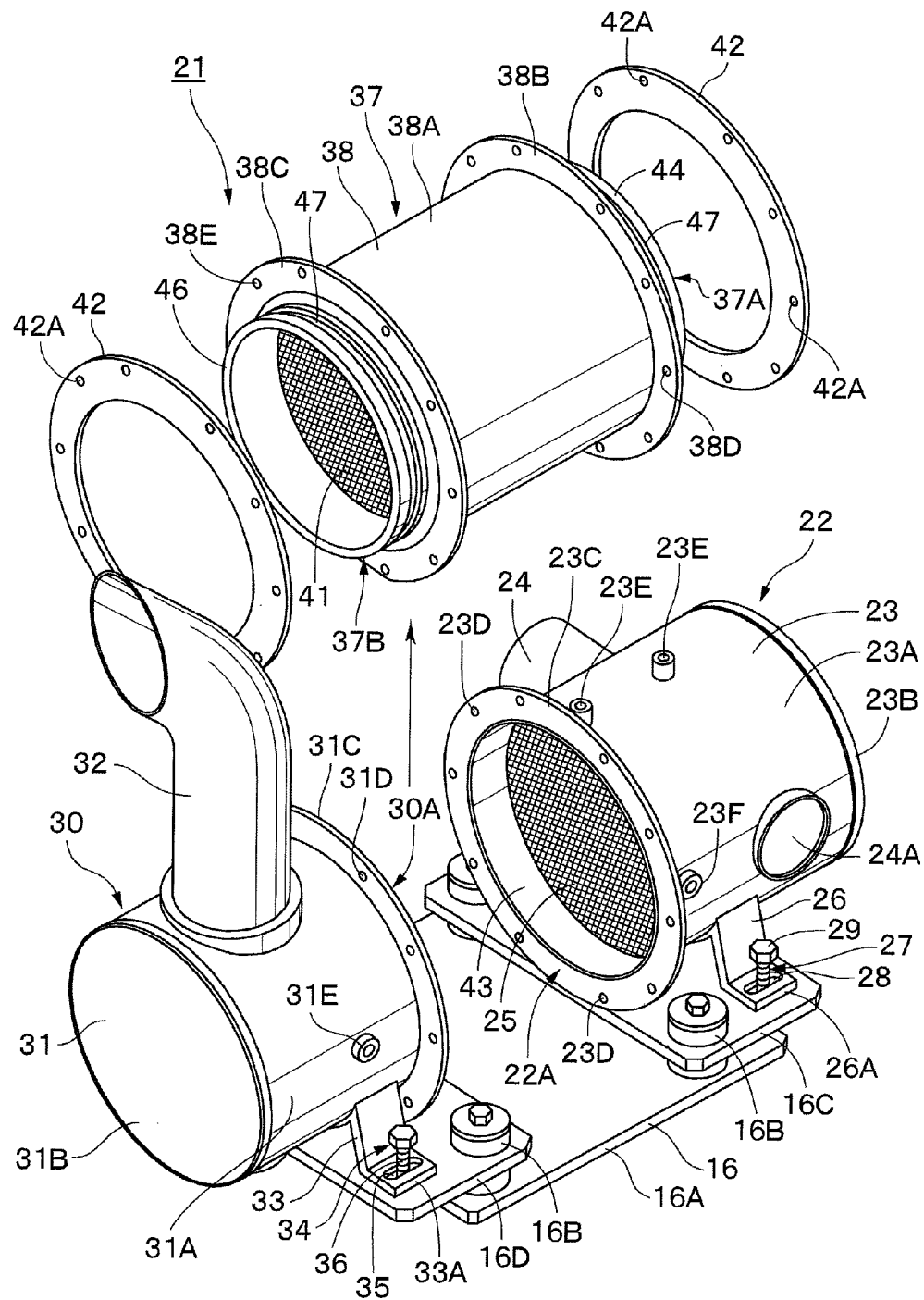

As shown in FIGS. 3 to 6, the exhaust gas treatment device 21 is configured by connecting in series three cylinders composed of an upstream cylinder 22, a downstream cylinder 30 and a filter accommodating cylinder 37 as a purifying part cylinder, which will be described later, with each other in a state of being radially positioned by projecting portions 44 and 46 or the like. Further, as shown in FIGS. 6 and 8, a muffler cylinder 24B of an inlet pipe 24 and the oxidation catalyst 25 to be described later are accommodated in the upstream cylinder 22, a muffler cylinder 32B of an outlet pipe 32 to be described later is accommodated in the downstream cylinder 30 and the DPF 41 to be described later is accommodated in the filter accommodating cylinder 37.

First, denoted at 22 is the upstream cylinder positioned at the front portion side of the exhaust gas treatment device 21 to be provided at the upstream side of the exhaust gas passage. The upstream cylinder 22 is formed of a lidded cylindrical body for forming an inlet portion for the exhaust gas to flow in. As shown in FIGS. 6 to 8, the upstream cylinder 22 is largely constituted by a cylindrical case 23, the inlet pipe 24, the oxidation catalyst 25 and a placing leg 26, which will be described hereinafter.

Here, an opening end in the rear side of the upstream cylinder 22, which is connected to the filter accommodating cylinder 37 to be described later, is formed as a connecting portion 22A. It should be noted that the connecting portion 22A is constituted by a flange portion 23C to be described later.

Denoted at 23 is the cylindrical case constituting an outer shape of the upstream cylinder 22. The cylindrical case 23 is constituted by a cylindrical portion 23A having a large-diameter cylindrical shape, a lid portion 23B provided to close the front side (upstream side) of the cylindrical portion 23A, and the flange portion 23C provided in a collar shape over the entire circumference at an end portion of the rear side (downstream side) of the cylindrical portion 23A. A plurality of bolt passage holes 23D are provided in the flange portion 23C at intervals in the circumferential direction. A connecting surface of the flange portion 23C is formed as a flat surface perpendicular to an axis O1-O1 passing through each axial center of the upstream cylinder 22, the downstream cylinder 30 and the filter accommodating cylinder 37. Further, the flange portion 23C constitutes the connecting portion 22A of the upstream cylinder 22.

In addition, two temperature sensor mounting ports 23E are provided in the cylindrical case 23 to be positioned at an upper portion of the cylindrical portion 23A. As shown in FIGS. 3 and 4, the two temperature sensor mounting ports 23E serve to mount temperature sensors 49 and 50 to be described later and are disposed at two locations to sandwich the oxidation catalyst 25 therebetween in the front and rear directions. An upstream side pressure pick out portion 23F is provided at a rear side position of the cylindrical portion 23A to be positioned at the right side, for example. The pressure pick out portion 23F takes out an upstream side pressure of the DPF 41 to be described later among pressures of the exhaust gas flowing in the exhaust gas passage and is configured such that a pressure sensor 48 to be described later is connected through an upstream side pipe 48A thereto.

Indicated at 24 is the inlet pipe provided at the front side (upstream side) of the cylindrical case 23. The inlet pipe 24 radially penetrates through the cylindrical portion 23A of the cylindrical case 23 (see FIG. 7). As shown in FIG. 2, one end side of the inlet pipe 24 projecting from the cylindrical case 23 extends in the left side toward the exhaust pipe 9 and is connected to the exhaust pipe 9. On the other hand, the other end side of the inlet pipe 24 is closed by a closing plate 24A. The inlet pipe 24 serves as a muffler cylinder 24B inside the cylindrical case 23 in which many small diameter passages are formed for reducing exhaust noises.

Indicated at 25 is the oxidation catalyst which is accommodated in the cylindrical case 23 by being located on the downstream side of the inlet pipe 24, and the oxidation catalyst 25 constitutes one of treatment members for purifying an exhaust gas. As shown in FIGS. 6 and 8, the oxidation catalyst 25 is formed by, for example, a ceramic-made cellular cylindrical body, having an outer diameter dimension equivalent to an inner diameter dimension of the cylindrical portion 23A. A multiplicity of through holes 25A are axially formed in the oxidation catalyst 25 and an inner surface of the through holes 25A is coated with a noble metal such as platinum (Pt). As the exhaust gas flows through each of the through holes 25A at a predetermined temperature, the oxidation catalyst 25 oxidizes and removes carbon monoxide (CO), hydrocarbons (HC) and the like contained in the exhaust gas and removes nitrogen oxides (NO) therein as nitrogen dioxides ($NO_2$).

Indicated at 26 is the placing leg provided on the lower side of the cylindrical case 23 (cylindrical portion 23A) constituting the upstream cylinder 22. The placing leg 26 serves to mount the upstream cylinder 22 on a front side mounting plate 16C of the treatment device supporting bracket 16. As shown in FIGS. 7 and 8, the placing leg 26 is formed, for example, by bending an elongated steel plate to be in a substantially M-shape, and a base end side (upper end side) curved in an arc shape thereof is secured to a lower surface of the cylindrical portion 23A by welding means. In addition, both distal end sides (lower end sides) of the placing leg 26 are provided with left and right flat abutting surfaces 26A abutting against the front side mounting plate 16C of the treatment device supporting bracket 16. An elongated hole 28 to be described later is formed in each of the left and right abutting surfaces 26A.

Denoted at 27 is a front side (upstream side) cylinder moving mechanism provided between the placing leg 26 of the upstream cylinder 22 and the front side mounting plate 16C of the treatment device supporting bracket 16. This cylinder moving mechanism 27 allows the upstream cylinder 22 to move in the axis O1-O1 direction (front and rear directions)

at the time of mounting and removing the filter accommodating cylinder 37 to be described later between the upstream cylinder 22 and the downstream cylinder 30. As shown in FIGS. 5 and 8, the cylinder moving mechanism 27 is constituted by the elongated hole 28 and a bolt 29 to be described later.

Indicated at 28 is the elongated hole constituting the cylinder moving mechanism 27. The elongated hole 28 is formed in each of the left and right abutting surfaces 26A of the placing leg 26 secured to the cylindrical case 23 of the upstream cylinder 22. The elongated hole 28 is formed linearly extending to be elongated in the axis O1-O1 direction of the upstream cylinder 22 and the bolt 29 to be described later is inserted in the elongated hole 28 to be movable relatively in the longitudinal direction.

Indicated at 29 is the bolt for fastening the abutting surface 26A of the placing leg 26 to the front side mounting plate 16C of the treatment device supporting bracket 16. The bolt 29 is threaded into a back nut 16F through a bolt passage hole 16E formed in the front side mounting plate 16C of the treatment device supporting bracket 16 in a state where the bolt 29 is inserted into the elongated hole 28 provided in the abutting surface 26A of the placing leg 26 to fasten the abutting surface 26A of the placing leg 26 to the front side mounting plate 16C (see FIG. 7). Accordingly, in a state where the bolt 29 is loosened, when the elongated hole 28 provided in the abutting surface 26A moves relatively along the bolt 29, the placing leg 26 can move on the front side mounting plate 16C in the axis O1-O1 direction within a range of a length dimension of the elongated hole 28.

Next, designated at 30 is the downstream cylinder positioned in the rear portion side of the exhaust gas treatment device 21 to be provided in the downstream side of the upstream cylinder 22. The downstream cylinder 30 is disposed at the opposite side to the upstream cylinder 22 to sandwich the filter accommodating cylinder 37 to be described later therebetween and is formed of a lidded cylindrical body constituting an outlet portion for discharging an exhaust gas. The downstream cylinder 30 is largely constituted by the cylindrical case 31, the outlet pipe 32 and the placing leg 33, which will be described hereinafter.

Here, an opening end in the front side of the downstream cylinder 30, which is connected to the filter accommodating cylinder 37 to be described later, is a connecting portion 30A. It should be noted that the connecting portion 30A is constituted by a flange portion 31C to be described later.

Denoted at 31 is the cylindrical case constituting an outer shape of the downstream cylinder 30. The cylindrical case 31 is, as substantially similar to the cylindrical case 23 of the upstream cylinder 22, constituted by a cylindrical portion 31A having a large-diameter cylindrical shape, a lid portion 31B provided to close a rear side (downstream side) of the cylindrical portion 31A, and the flange portion 31C provided in a collar shape over the entire circumference at an end portion of the front side (upstream side) of the cylindrical portion 31A. A plurality of bolt passage holes 31D are provided in the flange portion 31C at intervals in the circumferential direction. A connecting surface of the flange portion 31C is formed as a flat surface perpendicular to an axis O1-O1. Further, the flange portion 31C constitutes the connecting portion 30A of the downstream cylinder 30.

A downstream side pressure pick out portion 31E is provided at the rear side position of the cylindrical portion 31A by being located on the right side, for example. The pressure pick out portion 31E takes out a pressure downstream of the DPF 41 among pressures of the exhaust gas flowing in the exhaust gas passage, and a pressure sensor 48 to be described later is connected through a downstream side pipe 48B to the pressure pick out portion 31E.

Indicated at 32 is the outlet pipe called a tail pipe provided on the rear side (downstream side) of the cylindrical case 31. The outlet pipe 32 radially penetrates through the cylindrical portion 31A of the cylindrical case 31 (see FIG. 6). An upper end side of the outlet pipe 32 projecting from the cylindrical case 31 projects upwardly of the housing cover 15 shown in FIG. 1 to be opened to an atmosphere. On the other hand, a lower end side of the outlet pipe 32 is closed by a closing plate 32A. The outlet pipe 32 serves as a muffler cylinder 32B inside the cylindrical case 31 in which many small diameter passages are formed for reducing exhaust noises.

Indicated at 33 is the placing leg provided on the lower side of the cylindrical case 31 (cylindrical portion 31A) constituting the downstream cylinder 30. The placing leg 33 serves to mount the downstream cylinder 30 on a rear side mounting plate 16D of the treatment device supporting bracket 16. Here, as similar to the placing leg 26 of the above-mentioned upstream cylinder 22, the placing leg 33 is bent in a substantially M-shape and is secured to a lower surface of the cylindrical portion 31A by welding means. An elongated hole 35 to be described later is formed in each of the left and right abutting surfaces 33A positioned in both distal end sides (lower end sides) of the placing leg 33.

Denoted at 34 is a rear side (downstream side) cylinder moving mechanism provided between the placing leg 33 of the downstream cylinder 30 and the rear side mounting plate 16D of the treatment device supporting bracket 16. This rear side cylinder moving mechanism 34 is, as similar to the front side cylinder moving mechanism 27, constituted by the elongated hole 35 and a bolt 36 to be described later.

Indicated at 35 is the elongated hole constituting the cylinder moving mechanism 34. The elongated hole 35 is formed in each of the left and right abutting surfaces 33A of the placing leg 33 in the downstream cylinder 30. The elongated hole 35 is, as substantially similar to the elongated hole 28 of the front side cylinder moving mechanism 27, formed linearly extending to be elongated in the axis O1-O1 direction of the downstream cylinder 30. By inserting the bolt 36 into the elongated hole 35 of the placing leg 33 and threading the bolt 36 into the back nut 16F of the rear side mounting plate 16D, the abutting surface 33A of the placing leg 33 is fastened to the rear side mounting plate 16D. On the other hand, in a state where the bolt 36 is loosened, the placing leg 33 can be moved in the elongated hole 35.

Next, designated at 37 is one filter accommodating cylinder connected in series between the upstream cylinder 22 and the downstream cylinder 30. This filter accommodating cylinder 37 constitutes a purifying part cylinder for accommodating treatment members for effecting the purification treatment of exhaust gas. As shown in FIGS. 6 and 8, the filter accommodating cylinder 37 is formed of a cylindrical body both ends of which are opened in the axial direction and is largely constituted by a cylindrical case 38 and the DPF 41, which will be described hereinafter.

Here, the filter accommodating cylinder 37 has an opening end in the upstream side which is an upstream side connecting portion 37A connected to the connecting portion 22A of the upstream cylinder 22 and an opening end in the downstream side which is a downstream side connecting portion 37B connected to the connecting portion 30A of the downstream cylinder 30. The upstream side connecting portion 37A is constituted by a front side flange portion 38B and a front side projecting portion 44, and the downstream side connecting portion 37B is constituted by a rear side flange portion 38C and a rear side projecting portion 46.

Denoted at 38 is the cylindrical case constituting an outer shape of the filter accommodating cylinder 37. The cylindrical case 38 accommodates the DPF 41 therein. Here, the cylindrical case 38 is largely constituted by a cylindrical portion 38A having an outer diameter dimension substantially equal to that of each of the cylindrical case 23 of the upstream cylinder 22 and the cylindrical case 31 of the downstream cylinder 30, a front side flange portion 38B provided in a collar shape over the entire circumference at an end portion of the front side (upstream side) of the cylindrical portion 38A, and a rear side flange portion 38C provided in a collar shape over the entire circumference at an end portion of the rear side (downstream side) of the cylindrical portion 38A. It should be noted that a connecting surface of each of the flange portions 38B and 38C is formed as a flat surface perpendicular to an axis O1-O1.

The front side flange portion 38B is provided with a plurality of bolt passage holes 38D in positions corresponding to the bolt passage holes 23D of the cylindrical case 23 constituting the upstream cylinder 22. The front side flange portion 38B is connected in series to the flange portion 23C of the cylindrical case 23 using the bolts 39 inserted into the respective bolt passage holes 38D and nuts 40. On the other hand, the rear side flange portion 38C is provided with a plurality of bolt passage holes 38E in positions corresponding to the bolt passage holes 31D of the cylindrical case 31 constituting the downstream cylinder 30. The rear side flange portion 38C is connected in series to the flange portion 31C of the cylindrical case 31 using the bolts 39 inserted into the respective bolt passage holes 38E and nuts 40.

Denoted at 41 is a particulate matter removing filter (DPF) accommodated in the cylindrical case 38. This DPF 41 constitutes one of the treatment members. As shown in FIG. 6, the DPF 41 is constituted by surrounding a porous member cylindrically formed, for example, of a ceramic material with a buffer material or heat insulating material.

The DPF 41 has a cellular cylindrical body of a honeycomb structure provided with a multiplicity of small diameter passages 41A in an axial direction, and contiguously alternate and different end portions of small diameter passages 41A are each closed by a sealing member 41B. As the exhaust gas flowing into each of the small diameter passages 41A from the upstream side is passed through the porous material, the DPF 41 captures particulate matters and causes the exhaust gas alone to flow out to the downstream side through the adjacent small diameter passages 41A.

In this case, the particulate matter captured by the DPF 41 is burned and removed, but part of it is gradually deposited in the small diameter passages 41A as ashes. In addition, the other unburned residues such as heavy metals, calcium, and the like in engine oil are also gradually deposited. Therefore, the arrangement provided is such that pressure on the upstream side and the downstream side of the DPF 41 are measured by the below-described pressure sensor 48, and when a pressure difference between the upstream side and the downstream side has reached a predetermined value, the DPF 41 is removed from the cylindrical case 38 of the filter accommodating cylinder 37 to clean the deposits.

Figure 9:
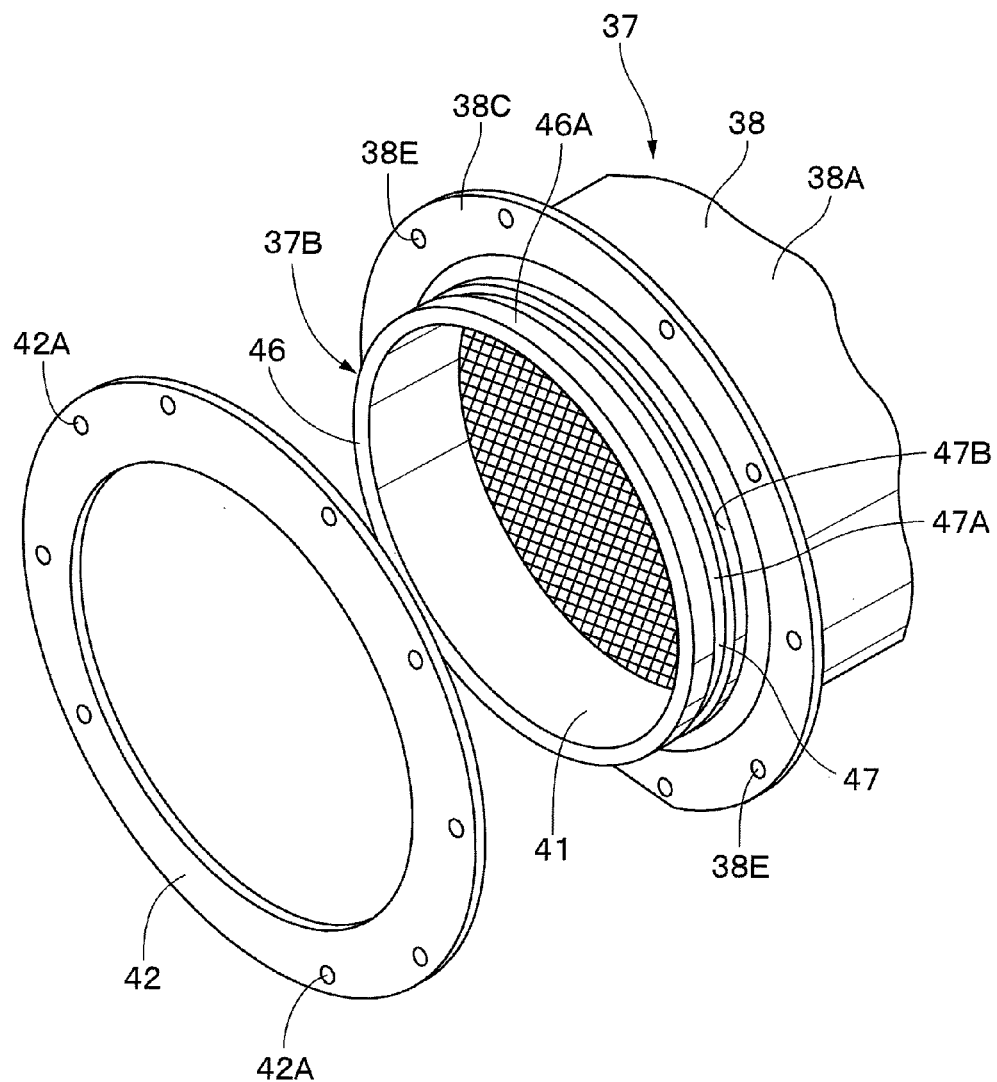
FIG. 9 is an enlarged exploded perspective view of essential portions illustrating a rear side projecting portion, an engaging groove and the gasket of the filter accommodating cylinder.

Denoted at 42 are two sheets of gaskets. One of the gaskets 42 is provided between the cylindrical case 23 of the upstream cylinder 22 and the cylindrical case 38 of the filter accommodating cylinder 37, and the other of the gaskets 42 is provided between the cylindrical case 31 of the downstream cylinder 30 and the cylindrical case 38 of the filter accommodating cylinder 37. As shown in FIGS. 6, 8 and 9, each gasket 42 is formed as a circular plate having a diameter dimension and an inner diameter dimension (hole diameter dimension) substantially similar to those of each of the front side flange portion 38B and the rear side flange portion 38C of the cylindrical case 38 by using a metal plate such as a stainless steel plate. In addition, each gasket 42 is provided with plural bolt passage holes 42A formed therein corresponding to the respective bolt passage holes 38D of the front side flange portion 38B and the respective bolt passage holes 38E of the rear side flange portion 38C.

The gasket 42 is positioned at an outer peripheral side of each of the projecting portions 44 and 46 to be described later to be held tightly between the flange portion 23C of the cylindrical case 23 and the front side flange portion 38B of the cylindrical case 38. In consequence, the gasket 42 seals air-tightly a contacting surface with the cylindrical case 23 of the upstream cylinder 22, as well as a contacting surface with the cylindrical case 38 of the filter accommodating cylinder 37, and also seals air-tightly a contacting surface with the cylindrical case 31 of the downstream cylinder 30, as well as a contacting surface with the cylindrical case 38 of the filter accommodating cylinder 37.

Next, among the connecting portions 22A and 37A directly opposing with each other of the upstream cylinder 22 and the filter accommodating cylinder 37, an opening portion 43 provided in the connecting portion 22A and a front side projecting portion 44 provided in the connecting portion 37A will be described.

First, denoted at 43 is the opening portion provided in the connecting portion 22A of the upstream cylinder 22 as one cylinder. The opening portion 43 is configured for the front side projecting portion 44 to be inserted therein and is positioned and opened at an inner diameter side of the flange portion 23C. The opening portion 43 is formed as a space into which the front side projecting portion 44 is inserted in a state of facing the oxidation catalyst 25.

Denoted at 44 is the front side projecting portion provided in the front end portion of the filter accommodating cylinder 37 as the other cylinder. The front side projecting portion 44 constitutes the upstream side connecting portion 37A together with the front side flange portion 38B of the cylindrical case 38. The front side projecting portion 44 is formed in a short cylindrical shape projecting toward a further forward side than the front side flange portion 38B. Further, the front side projecting portion 44 is inserted and fitted as spigot-like fitting in the opening portion 43 to position the upstream cylinder 22 and the filter accommodating cylinder 37 radially from each other, disposing both thereof coaxially with the axis O1-O1. An engaging groove 47 to be described later is formed over the entire circumference on an outer peripheral surface 44A of the front side projecting portion 44.

On the other hand, among the connecting portions 30A and 37B directly opposing with each other of the downstream cylinder 30 and the filter accommodating cylinder 37, an opening portion 45 provided in the connecting portion 30A and a rear side projecting portion 46 provided in the connecting portion 37B will be described.

Denoted at 45 is the opening portion provided in the connecting portion 30A of the downstream cylinder 30 as one cylinder. The opening portion 45 is configured for the rear side projecting portion 46 to be inserted therein and is positioned and opened at an inner diameter side of the flange portion 23C. The opening portion 45 is formed as a space into which the rear side projecting portion 46 is inserted in a state of facing the outlet pipe 32.

Denoted at 46 is the rear side projecting portion provided in the rear end portion of the filter accommodating cylinder 37 as the other cylinder. The rear side projecting portion 46 is formed symmetrical to the front side projecting portion 44 in the axis O1-O1 direction. The rear side projecting portion 46 constitutes the downstream side connecting portion 37B together with the rear side flange portion 38C of the cylindrical case 38. In addition, the rear side projecting portion 46 is formed in a short cylindrical shape projecting toward a further backward side than the rear side flange portion 38C. The rear side projecting portion 46 is inserted and fitted in the opening portion 45 to position the downstream cylinder 30 and the filter accommodating cylinder 37 radially from each other, disposing both thereof coaxially with the axis O1-O1. An engaging groove 47 is formed over the entire circumference on an outer peripheral surface 46A of the rear side projecting portion 46.

Indicated at 47 are engaging grooves as two engaging portions provided respectively in the front side projecting portion 44 and the rear side projecting portion 46 of the filter accommodating cylinder 37. In the present embodiment, since the two engaging grooves 47 are of the identical shape except that they are formed symmetrically in the axis O1-O1 direction, only the construction of the engaging groove 47 in the rear side projecting portion 46 is illustrated and the illustration of the engaging groove 47 in the front side projecting portion 44 is omitted.

That is, the two engaging grooves 47 are respectively formed on the outer peripheral surface 44A of one projecting portion 44 and on the outer peripheral surface 46A of the other projecting portion 46, each being formed as a recessed groove over the entire circumference. The gasket 42 is engaged with the engaging groove 47 which prevents the gasket 42 from falling off by the latching of the gasket 42 thereon at the time of mounting and removing the filter accommodating cylinder 37.

Figure 10:
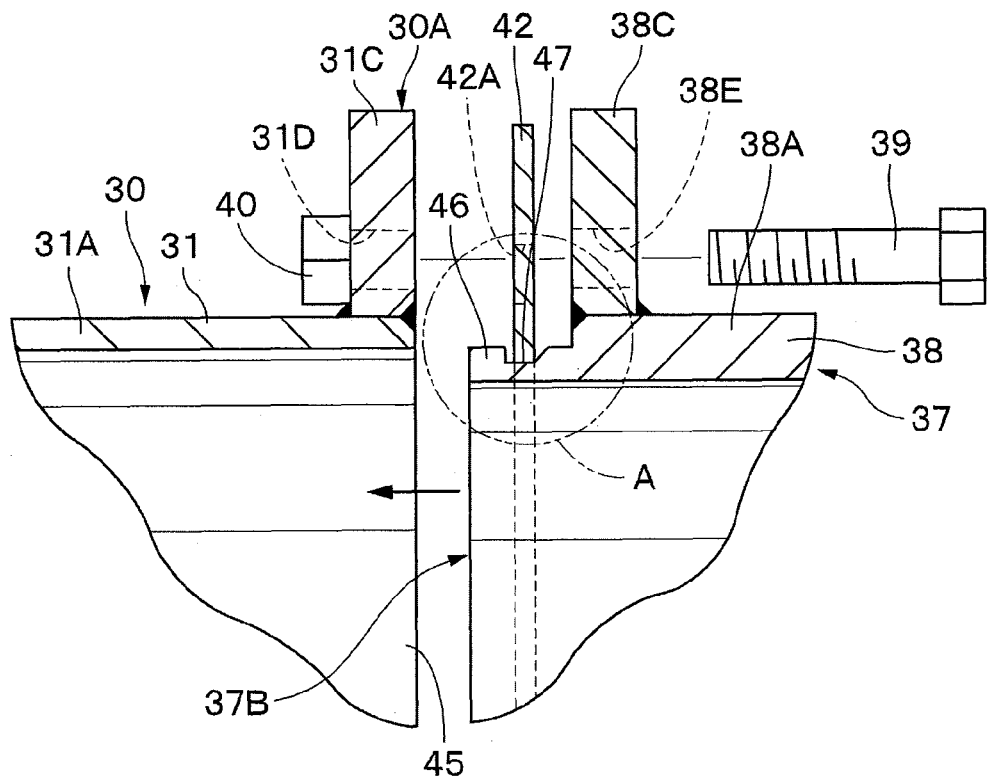
FIG. 10 is an enlarged longitudinal sectional view of essential portions illustrating a state of inserting the rear side projecting portion of the filter accommodating cylinder into an opening portion of the downstream cylinder with the gasket disposed therebetween.
Figure 11:
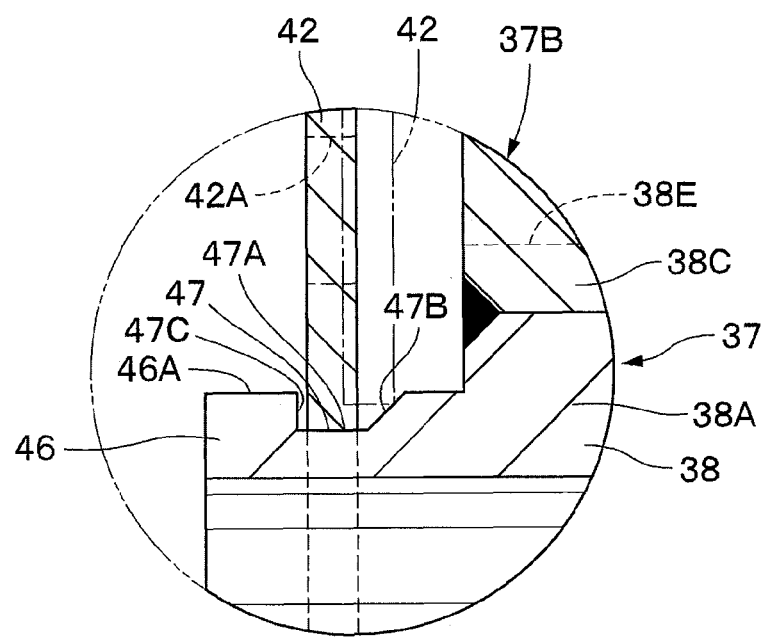
FIG. 11 is a longitudinal sectional view illustrating in enlarged form an A portion in FIG. 10.

As shown in FIGS. 10 and 11, the engaging groove 47 provided in the rear side projecting portion 46 is formed as a recessed groove in a substantially rectangular shape extending in a circumferential direction at an axial intermediate position of the rear side projecting portion 46. The engaging groove 47 is formed by a groove portion 47A in which the gasket 42 falls for engaging, an inclined surface portion 47B as a groove side surface at the side of the flange portion 38C of the groove portion 47A, and a vertical surface portion 47C positioned at the distal end side.

Figure 12:
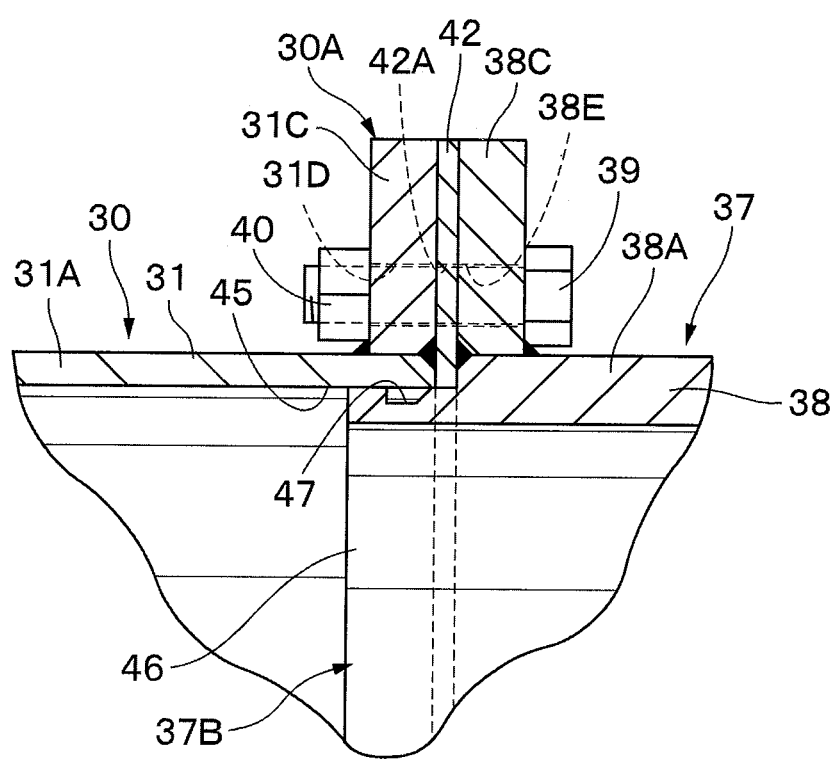
FIG. 12 is a longitudinal sectional view illustrating a state in which the downstream cylinder and the filter accommodating cylinder are connected by bolts as viewed from a position similar to that of FIG. 10.

Here, the inclined surface portion 47B is formed to diagonally connect the groove bottom of the groove portion 47A to the outer peripheral surface 46A of the rear side projecting portion 46. Therefore, the inclined surface portion 47B can automatically move the gasket 42 to a predetermined sealing position on the outer peripheral surface 46A of the rear side projecting portion 46 when the gasket 42 engaging with the engaging groove 47 moves on the rear side projecting portion 46 to the side of the rear side flange portion 38C. In this case, as shown in FIG. 12, the predetermined sealing position corresponds to a state where the gasket 42 substantially overlap the flange portion 38B or 38C of the cylindrical case 38 or a position where the bolt passage hole 42A of the gasket 42 corresponds to the bolt passage hole 38D or 38E of the flange portion 38B or 38C and the bolts 39 can be inserted into these holes. The vertical surface portion 47C serves to prevent the falling-off of the gasket 42.

Indicated at 48 is the pressure sensor (see FIGS. 3 and 4) provided on the outer peripheral side of the upstream cylinder 22. The pressure sensor 48 detects pressures of (pressure difference between) the upstream side and the downstream side of the DPF 41 to estimate the amount of deposits of the particulate matter, unburned residues and the like. The pressure sensor 48 is provided with an upstream side pipe 48A connected to the pressure pick out portion 23F at the cylindrical case 23 of the upstream cylinder 22 and a downstream side pipe 48B connected to the pressure pick out portion 31E at the cylindrical case 31 of the downstream cylinder 30.

Indicated at 49 is the upstream side temperature sensor provided on the upstream side of the cylindrical case 23 of the upstream cylinder 22. The upstream side temperature sensor 49 is mounted at the temperature sensor mounting port 23E located on the upstream side of the cylindrical case 23 and is connected to a controller (not shown). The upstream side temperature sensor 49 is for detecting the temperature of the exhaust gas flowing into the cylindrical case 23, so as to confirm whether or not the temperature is such as to allow the oxidation catalyst 25 to function.

Indicated at 50 is the downstream side temperature sensor provided on the downstream side of the cylindrical case 23 of the upstream cylinder 22. The downstream side temperature sensor 50 is for detecting the temperature of the exhaust gas which has passed through the oxidation catalyst 25, so as to confirm whether or not the oxidation (regeneration) of the particulate matter captured by the DPF 41 is possible.

The exhaust gas treatment device 21 according to the first embodiment has the aforementioned construction, and next, an operation thereof will be explained.

When the engine 8 is started to perform an excavating operation or the like by the hydraulic excavator 1, exhaust gas containing harmful substances such as particulate matter, nitrogen oxides, and the like is emitted from the engine 8 through the exhaust pipe 9, and the exhaust gas is introduced into the exhaust gas treatment device 21 through the inlet pipe 24.

At this time, when the exhaust gas passes through the oxidation catalyst 25 accommodated in the upstream cylinder 22, the exhaust gas treatment device 21 oxidizes and removes carbon monoxide (CO), hydrocarbons (HC) and the like contained in the exhaust gas. By introducing the exhaust gas which has passed through the oxidation catalyst 25 into the DPF 41 accommodated in the filter accommodating cylinder 37, the DPF 41 can capture the particulate matter contained in the exhaust gas and burn (regenerate) the captured particulate matter for removal.

The exhaust gas thus purified by the exhaust gas treatment device 21 is muffled by the muffler cylinder 32B of the outlet pipe 32 in the downstream cylinder 30, and is thereafter emitted through the outlet pipe 32 to an outside.

Thus, the particulate matter captured by the DPF 41 is burned and removed, but part of it is reduced to ashes and is gradually deposited in the small diameter passages 41A of the DPF 41. Further, the other unburned residues, such as heavy metals, calcium and the like in engine oil are also gradually deposited.

For this reason, a pressure difference between the pressure on the upstream side of the DPF 41 and the pressure on the downstream side thereof is measured by the pressure sensor 48, and when the pressure difference has reached a predetermined value, it is necessary to remove the filter accommodating cylinder 37 accommodating the DPF 41 and clean the deposits.

Accordingly, a cleaning operation for removing the particulate matter deposited in the DPF 41 will be explained.

In performing this cleaning operation, each of the bolts 39 and nuts 40 for connecting the flange portion 23C of the upstream cylinder 22 to the front side flange portion 38B of the filter accommodating cylinder 37 are removed and each of the bolts 39 and nuts 40 for connecting the flange portion 31C of the downstream cylinder 30 to the rear side flange portion 38C of the filter accommodating cylinder 37 are removed.

Next, as shown in FIG. 8, the placing leg 26 of the upstream cylinder 22 is moved to the front side within the range of the elongated hole 28 formed in the abutting surface 26A by loosening the bolt 29 constituting the front side cylinder moving mechanism 27. Further, the placing leg 33 of the downstream cylinder 30 is moved to the rear side within the range of the elongated hole 35 formed in the abutting surface 33A by loosening the bolt 36 constituting the rear side cylinder moving mechanism 34.

Thereby, the projecting portions 44 and 46 of the filter accommodating cylinder 37 can be pulled out from the opening portions 43 and 45 of the cylinders 22 and 30. Accordingly, in a state where the upstream cylinder 22 is being mounted through the placing leg 26 to the front side mounting plate 16C of the treatment device supporting bracket 16 and the downstream cylinder 30 is being mounted through the placing leg 33 to the rear side mounting plate 16D of the treatment device supporting bracket 16, only the filter accommodating cylinder 37 can be removed upwards from the upstream cylinder 22 and the downstream cylinder 30.

In addition, when the filter accommodating cylinder 37 is removed upwards, there are some cases where the filter accommodating cylinder 37 is inclined and the gasket 42 tends to easily fall off. However, since the engaging groove 47 is provided in the axial intermediate position of each of the projecting portions 44 and 46, the gasket 42 which may fall off can be engaged with the engaging groove 47 to easily remove the filter accommodating cylinder 37.

Besides, since only the filter accommodating cylinder 37 can be removed upwards from the upstream cylinder 22 and the downstream cylinder 30, even in a case where the exhaust gas treatment device 21 is disposed in a narrow space within the housing cover 15 together with mounted equipment such as the engine 8 and the hydraulic pump 10, an operator can safely and easily perform an operation without being hampered by the other mounted equipments.

Further, it is possible to clean the DPF 41 by blowing compressed air by using, for instance, an air spray gun onto the DPF 41 accommodated in the filter accommodating cylinder 37 to remove ashes of the particulate matter and unburned residues deposited in the small diameter passages 41A.

After thus cleaning the DPF 41, the filter accommodating cylinder 37 accommodating the DPF 41 is moved to the lower side between the upstream cylinder 22 and the downstream cylinder 30. At this time, when the gasket 42 is engaged with the engaging groove 47 provided in each of the projecting portions 44 and 46, an assembly operation can smoothly be performed without caring for the falling-off of the gasket 42.

Next, in a case of connecting the filter accommodating cylinder 37 to the upstream cylinder 22 and the downstream cylinder 30, first, the filter accommodating cylinder 37 is disposed in a predetermined position between the upstream cylinder 22 and the downstream cylinder 30. As a next step, the placing leg 26 of the upstream cylinder 22 is moved to the side of the filter accommodating cylinder 37 along the elongated hole 28 engaged with the bolt 29 and also the placing leg 33 of the downstream cylinder 30 is moved to the side of the filter accommodating cylinder 37 along the elongated hole 35 engaged with the bolt 36. In consequence, the front side projecting portion 44 of the filter accommodating cylinder 37 is fitted to the opening portion 43 of the upstream cylinder 22 and the rear side projecting portion 46 of the filter accommodating cylinder 37 is fitted to the opening portion 45 of the downstream cylinder 30.

At this time, as shown in FIG. 11, the gasket 42 can be moved to the outer peripheral surface 46A of the rear side projecting portion 46 by going upon the inclined surface portion 47B. Therefore, the gasket 42 can automatically move to a predetermined sealing position on the outer peripheral surface 46A of the rear side projecting portion 46.

Further, the bolts 39 are inserted into the bolt passage holes 38D provided in the front side flange portion 38B of the filter accommodating cylinder 37, the bolt passage holes 42A of the gasket 42 and the bolt passage holes 23D provided in the flange portion 23C of the upstream cylinder 22, and the nuts 40 are threaded into the bolts 39. Thereby, as shown in FIG. 6 or the like, the filter accommodating cylinder 37 and the upstream cylinder 22 can be connected in series through the gasket 42. Likewise, the rear side flange portion 38C of the filter accommodating cylinder 37, the gasket 42 and the flange portion 31C of the downstream cylinder 30 can be connected in series through the bolts 39 and the nuts 40.

In this way, when the filter accommodating cylinder 37 is connected in series between the upstream cylinder 22 and the downstream cylinder 30, the placing leg 26 of the upstream cylinder 22 is fixed to the front side mounting plate 16C of the treatment device supporting bracket 16 by screwing the bolt 29 of the front side cylinder moving mechanism 27, and the placing leg 33 of the downstream cylinder 30 is fixed to the rear side mounting plate 16D of the treatment device supporting bracket 16 by screwing the bolt 36 of the rear side cylinder moving mechanism 34.

In consequence, according to the first embodiment, the engaging groove 47 with which the gasket 42 is engaged is provided in each of the front side projecting portion 44 and the rear side projecting portion 46 formed in the filter accommodating cylinder 37 to be positioned on each of the outer peripheral surfaces 44A and 46A. Accordingly, when the gasket 42 latches on each of the projecting portions 44 and 46 to be fitted thereon from outside, the gasket 42 can be engaged with the engaging groove 47 provided in each of the projecting portions 44 and 46. In consequence, at the time of mounting and removing the filter accommodating cylinder 37, even in a case where the filter accommodating cylinder 37 is inclined, the engaging groove 47 prevents the gasket 42 from falling off.

As a result, the filter accommodating cylinder 37 can be easily mounted to or removed from the upstream cylinder 22 and the downstream cylinder 30, and, for example, an operational efficiency at the time of performing an inspection operation or a cleaning operation of the incorporated DPF 41 can be improved.

Besides, the cylinder moving mechanisms 27 and 34 are provided between the treatment device supporting bracket 16 positioned at the side of the engine 8 and the respective placing legs 26 and 33 of the exhaust gas treatment device 21. In addition, the upstream cylinder 22 and the downstream cylinder 30 are axially moved by loosening the bolts 29 and 36 at the time of mounting and removing the filter accommodating cylinder 37. Therefore, at the time of mounting and removing the filter accommodating cylinder 37 to or from the upstream cylinder 22 and the downstream cylinder 30, the upstream cylinder 22 and the downstream cylinder 30 can be axially moved by loosening the bolts 29 and 36 of the cylinder moving mechanisms 27 and 34 to widen or narrow the axial interval between the upstream cylinder 22 and the downstream cylinder 30.

As a result, according to the cylinder moving mechanisms 27 and 34, the filter accommodating cylinder 37 can be mounted or removed between the upstream cylinder 22 and the downstream cylinder 30 by changing the axial interval between the upstream cylinder 22 and the downstream cylinder 30 without removing the placing legs 26 and 33 from the treatment device supporting bracket 16. In consequence, various inspection operations and cleaning operations can be easily performed.

Further, the engaging groove 47 provided in each of the projecting portions 44 and 46 is formed as a recessed groove in a substantially rectangular shape extending in a circumferential direction at an axial intermediate position of each of the projecting portions 44 and 46. In more detail, the engaging groove 47 is constituted by the groove portion 47A in which the gasket 42 falls for engaging, the inclined surface portion 47B as the groove side surface at the side of the flange portion 38B or 38C of the groove portion 47A, and the vertical surface portion 47C positioned at the distal end side. In addition, when the projecting portion 44 or 46 is inserted and fitted into the opening portion 43 or 45 in a state where the gasket 42 is being engaged with the engaging groove 47, the gasket 42 is pushed by the flange portion 23C or 31C to be moved to the side of the flange portion 38B or 38C. Therefore, the gasket 42 can be automatically moved to the predetermined sealing position on the outer peripheral surface 44A or 46A of the projecting portion 44 or 46 by the inclined surface portion 47B of the engaging groove 47. In addition, the vertical surface portion 47C restricts the gasket 42 to fall off inadvertently.

As a result, at the time of connecting the upstream cylinder 22 and the filter accommodating cylinder 37 or the downstream cylinder 30 and the filter accommodating cylinder 37, the gasket 42 goes down by an engaging amount by which the gasket 42 is engaged with the engaging groove 47. However, since the gasket 42 is automatically moved, it is not necessary to upraise the gasket 42 by hand. Therefore, the mounting or the removing operation of the filter accommodating cylinder 37 to or from the upstream cylinder 22 and the downstream cylinder 30 can be further easily performed.

Figure 13:
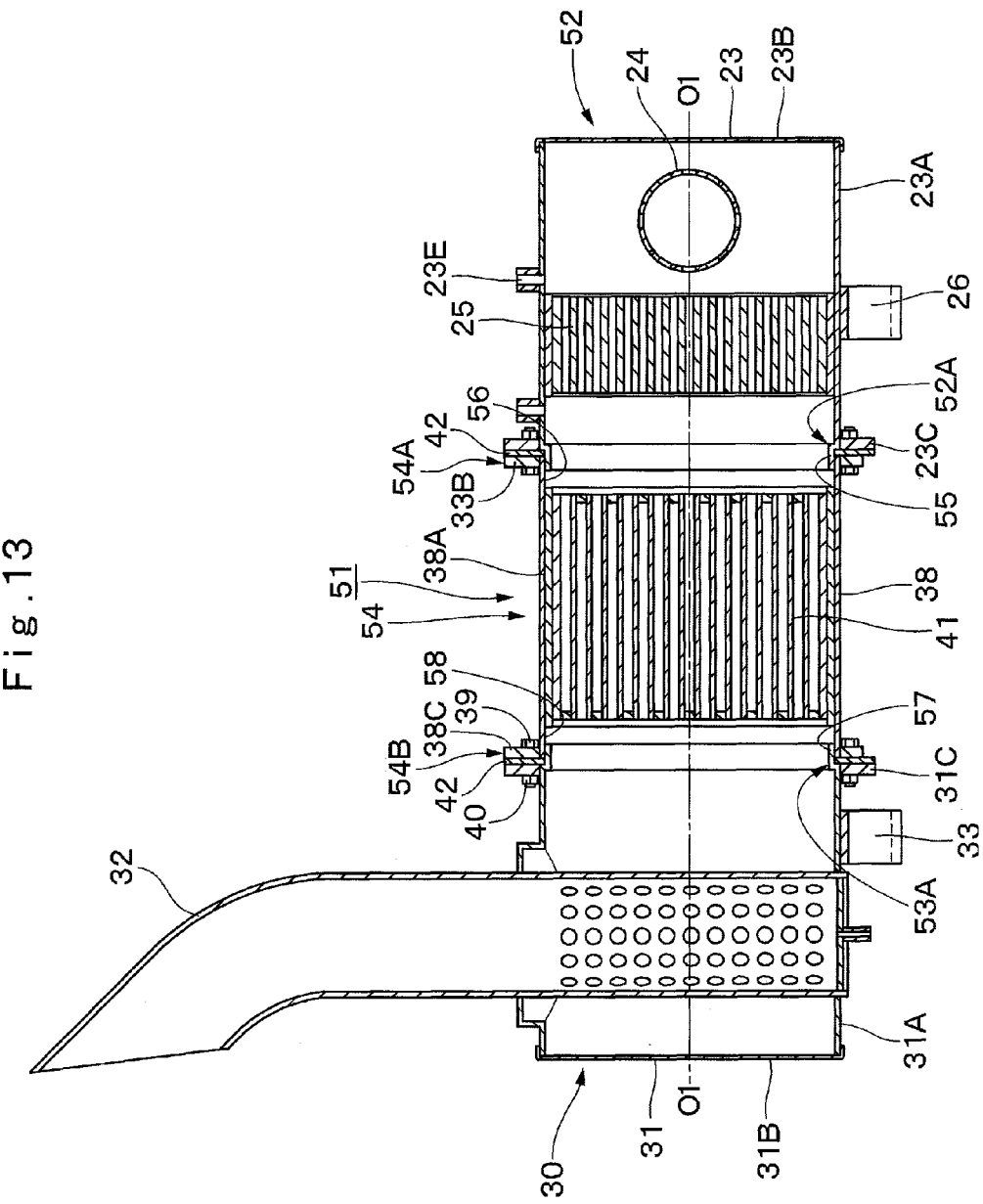
FIG. 13 is a longitudinal sectional view illustrating an internal structure of an exhaust gas treatment device according to a second embodiment.
Figure 14:
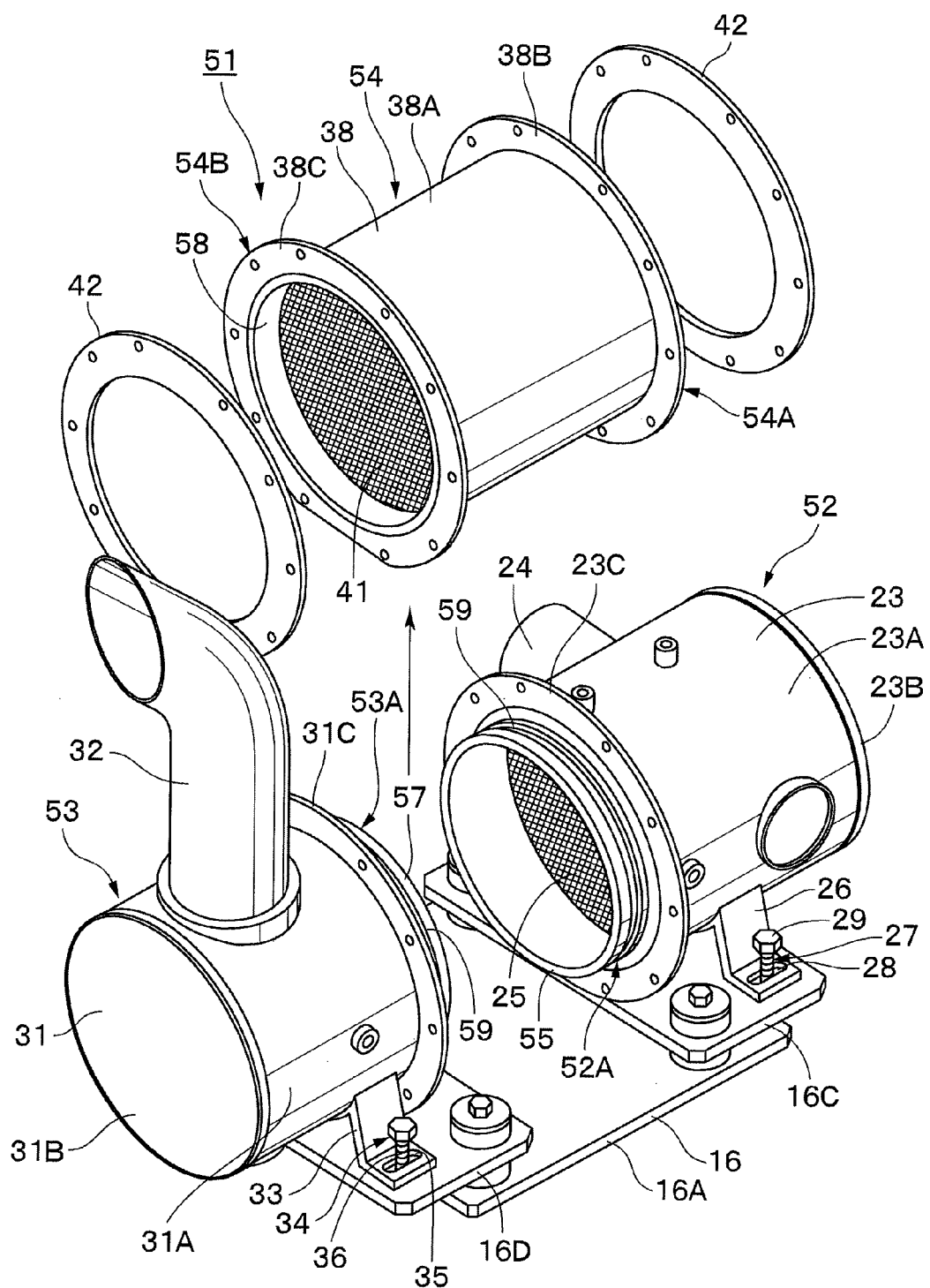
FIG. 14 is an exploded perspective view illustrating the exhaust gas treatment device according to the second embodiment.

Next, FIGS. 13 and 14 show a second embodiment of the present invention. The present embodiment is characterized by providing projecting portions to the upstream cylinder and the downstream cylinder as one cylinder, and providing opening portions, in which the projecting portions thereof are inserted and fitted, to the filter accommodating cylinder as the other cylinder. It should be noted that in the second embodiment, the component elements that are identical to those of the foregoing first embodiment will be simply denoted by the same reference numerals to avoid repetitions of similar explanations.

Denoted at 52 is an upstream cylinder positioned at the upstream side of an exhaust gas treatment device 51. The upstream cylinder 52 is largely constituted by the cylindrical case 23, the inlet pipe 24, the oxidation catalyst 25, and the placing leg 26. Here, the upstream cylinder 52 constituting one cylinder has an opening end at the downstream side as a connecting portion 52A. The connecting portion 52A is constituted by the flange portion 23C and a projecting portion 55.

Denoted at 53 is a downstream cylinder positioned at the downstream side of the exhaust gas treatment device 51. The downstream cylinder 53 is largely constituted by the cylindrical case 31, the outlet pipe 32 and the placing leg 33. Here, the downstream cylinder 53 constituting one cylinder has an opening end at the upstream side as a connecting portion 53A. The connecting portion 53A is constituted by the flange portion 31C and a projecting portion 57.

Denoted at 54 is a filter accommodating cylinder as a purifying part cylinder provided between the upstream cylinder 52 and the downstream cylinder 53. This filter accommodating cylinder 54 is largely constituted by the cylindrical case 38 and the DPF 41. Here, the filter accommodating cylinder 54 constituting the other cylinder has an opening end at the upstream side as an upstream side connecting portion 54A connected to the connecting portion 52A of the upstream cylinder 52 and an opening end at the downstream side as a downstream side connecting portion 54B connected to the connecting portion 53A of the downstream cylinder 53. The upstream side connecting portion 54A is constituted by the front side flange portion 38B and the downstream side connecting portion 54B is constituted by the rear side flange portion 38C.

Denoted at 55 is a projecting portion provided in the rear end portion of the cylindrical case 23 in the upstream cylinder 52 as one cylinder. Denoted at 56 is a front side opening portion provided in the front end portion of the cylindrical case 38 in the filter accommodating cylinder 54 as the other cylinder, and the front side opening portion 56 has a space into which the projecting portion 55 is inserted and fitted in a state of facing the oxidation catalyst 25.

On the other hand, denoted at 57 is a projecting portion provided in the rear end portion of the cylindrical case 31 in the downstream cylinder 53 as one cylinder. Denoted at 58 is a rear side opening portion provided in the rear end portion of the cylindrical case 38 in the filter accommodating cylinder 54 as the other cylinder, and the rear side opening portion 58 has a space into which the projecting portion 57 is inserted and fitted.

Denoted at 59 are engaging grooves as engaging portions provided in the projecting portions 55 and 57, and each engaging groove 59, as similar to the engaging groove 47 in the above-mentioned first embodiment, serves to be engaged with the gasket 42 and is formed as an entire circumferential groove opened to the outer diameter side.

As such, also in the second embodiment thus constituted, an operational effect substantially similar to that of the first embodiment can be obtained.

Figure 15:
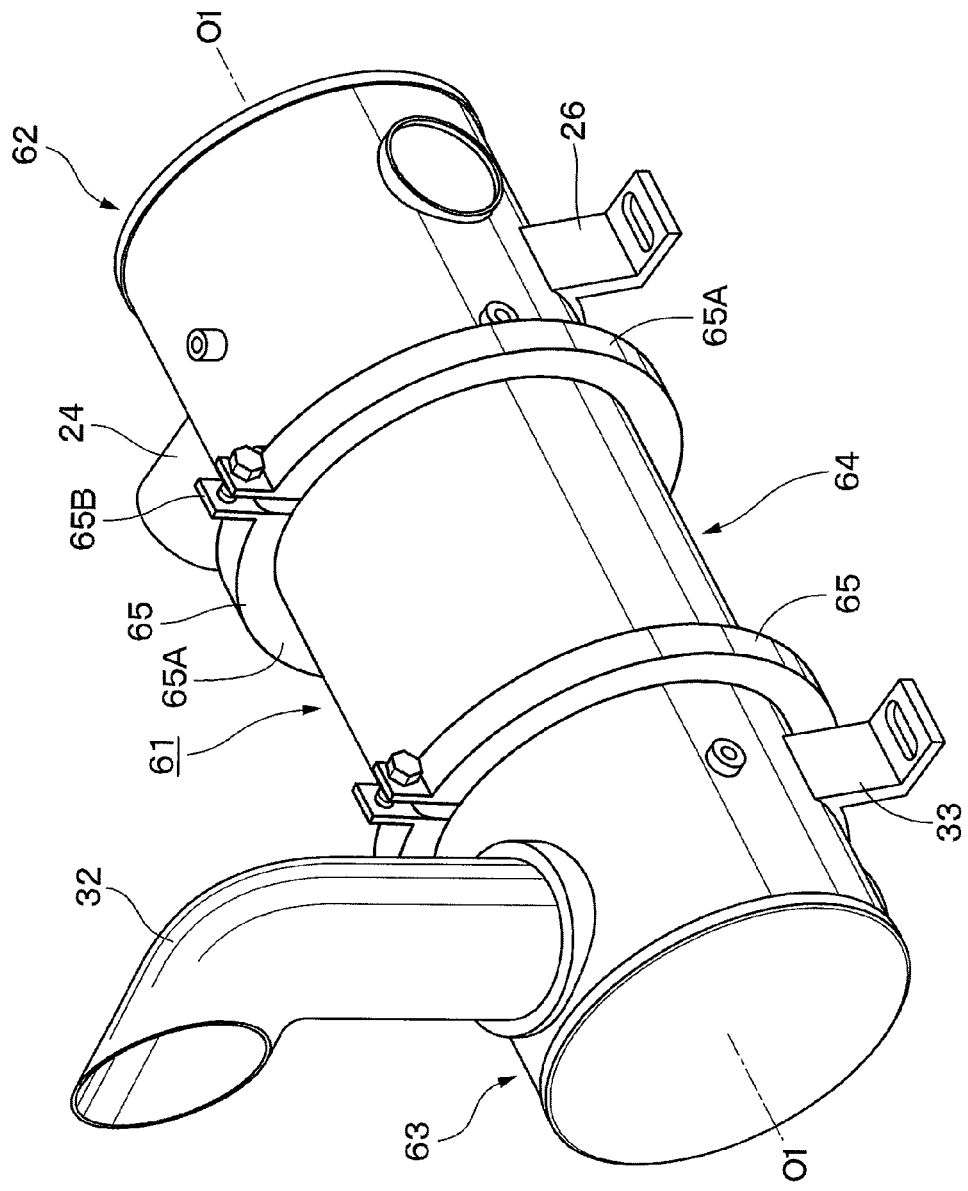
FIG. 15 is a perspective view illustrating an exhaust gas treatment device according to a third embodiment.
Figure 16:
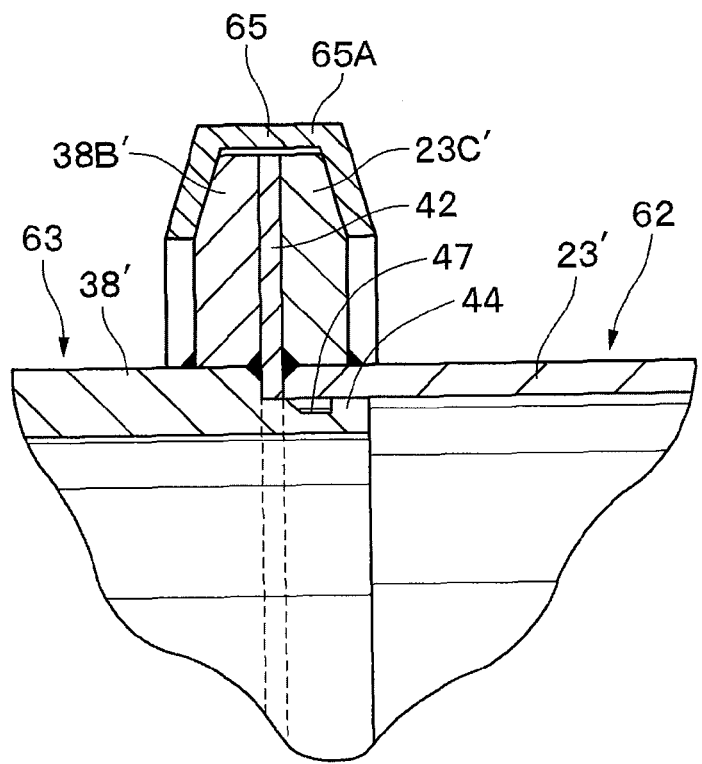
FIG. 16 is an enlarged longitudinal sectional view of essential portions of FIG. 15 illustrating a connecting structure of respective flanges by a clamping device.

Next, FIGS. 15 and 16 show a third embodiment of the present invention. The present embodiment is characterized by use of clamping devices each having a V-shape in cross section for connecting in series the respective cylinders. It should be noted that in the third embodiment, the component elements that are identical to those of the foregoing first embodiment will be simply denoted by the same reference numerals to avoid repetitions of similar explanations.

In FIG. 15, designated at 61 is an exhaust gas treatment device according to the third embodiment. The exhaust gas treatment device 61 is, as similar to the exhaust gas treatment device 21 according to the above-mentioned first embodiment, constituted by positioning in series the upstream cylinder 62, the downstream cylinder 63 and the filter accommodating cylinder 64 as the purifying part cylinder. However, the exhaust gas treatment device 61 according to the third embodiment differs from the exhaust gas treatment device 21 according to the first embodiment in a point where the upstream cylinder 62 and the filter accommodating cylinder 64, and the downstream cylinder 63 and the filter accommodating cylinder 64 are connected not by a plurality of bolts but clamping devices 65 to be described later.

As a result, as shown in FIG. 16, flange portions 23C' and 38B' of cylindrical cases 23' and 38' are not provided with bolt passage holes and an outer peripheral side of each of the flange portions 23C' and 38B' is formed in a tapered shape to be tailored to a V-shaped form of a frame body 65A of the clamping device 65 to be described later.

Denoted at 65 are clamping devices respectively detachably connecting the upstream cylinder 62 and the filter accommodating cylinder 64, and the downstream cylinder 63 and the filter accommodating cylinder 64. The clamping device 65 is largely constituted by two frame bodies 65A each having a semicircular shape and a substantially V-shaped form in cross section, a hinge portion (not shown) rotatably connecting one end sides of the respective frame bodies 65A, and a bolt and nut connecting portion 65B connecting the other end sides of the respective frame bodies 65A.

Therefore, the clamping device 65, as shown in FIG. 16, axially clamps the flange portions 23C' and 38B' of the cylindrical cases 23' and 38' holding the gasket 42 therebetween to connect the downstream cylinder 63 to the filter accommodating cylinder 64, and the upstream cylinder 62 and the filter accommodating cylinder 64 can be likewise connected.

As such, also in the third embodiment thus constituted, an operational effect substantially similar to that of the first embodiment can be obtained. Particularly in the third embodiment, since the clamping device 65 can connect or disconnect the upstream cylinder 62 and the filter accommodating cylinder 64, or the downstream cylinder 63 and the filter accommodating cylinder 64 simply by screwing or loosening one bolt of the connecting portion 65B located at the upper side, an operational efficiency can be improved.

Figure 17:
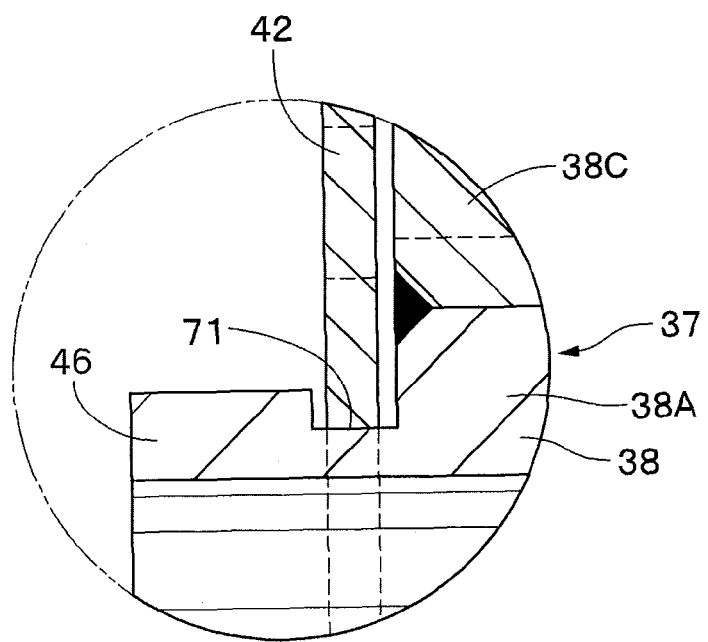
FIG. 17 is an enlarged longitudinal sectional view of essential portions illustrating an engaging groove according to a fourth embodiment as viewed from a position similar to that of FIG. 11.

Next, FIG. 17 shows a fourth embodiment of the present invention. The present embodiment is characterized by forming an engaging portion as an entire circumferential groove having a rectangular shape in cross section. It should be noted that in the fourth embodiment, the component elements that are identical to those of the foregoing first embodiment will be simply denoted by the same reference numerals to avoid repetitions of similar explanations.

In FIG. 17, denoted at 71 is an engaging groove as the engaging portion in the fourth embodiment provided instead of the engaging groove 47 in the first embodiment. The engaging groove 71 is formed as an entire circumferential groove having a rectangular shape in cross section on each of the projecting portions 44 and 46 provided in the cylindrical case 38 (illustrated only at the rear side). The engaging groove 71 is disposed at an inner diameter side of the flange portion 38B or 38C as a base end portion of the projecting portion 44 or 46.

As such, also in the fourth embodiment thus constituted, an operational effect substantially similar to that of the first embodiment can be obtained.

Figure 18:
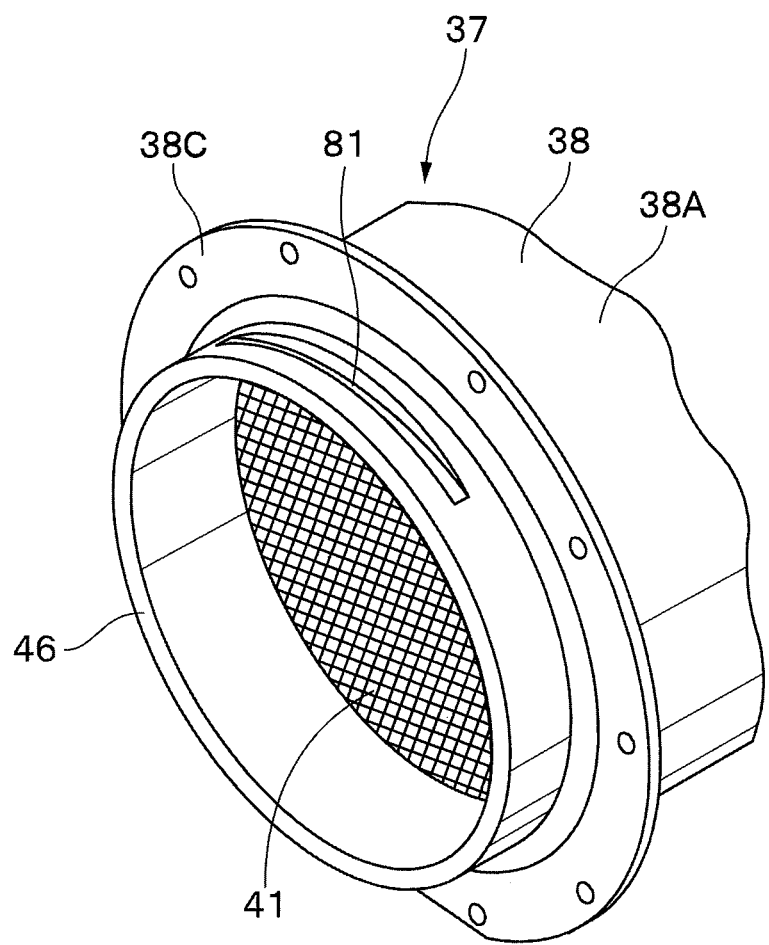
FIG. 18 is an enlarged perspective view illustrating a filter accommodating cylinder having an engaging groove according to a modification.

It should be noted that in the first embodiment, a description has been given by citing as an example the case where the engaging groove 47 is provided over the entire circumference on each of the projecting portions 44 and 46. However, the present invention is not limited to this particular example. As a modification shown in FIG. 18, an engaging groove 81 as an engaging portion may be formed only in an upper side portion on each of the projecting portions 44 and 46. In addition, engaging grooves may be formed at plural locations in a circumferential direction on each of the projecting portions 44 and 46. These constructions may be similarly applied to the other embodiments.

Further, the first embodiment is constructed such that the opening portions 43 and 45 are provided in the upstream cylinder 22 and the downstream cylinder 30 and the projecting portions 44 and 46 to be inserted and fitted into the opening portions 43 and 45 are provided at both ends of the filter accommodating cylinder 37. On the other hand, the second embodiment is constructed such that the projecting portions 55 and 57 are provided in the upstream cylinder 52 and the downstream cylinder 53 and the opening portions 56 and 58, into which the projecting portions 55 and 57 are inserted and fitted, are provided at both ends of the filter accommodating cylinder 54.

However, the present invention is not limited to these constructions, and, for example, the opening portions may be provided in the upstream cylinder and in the rear end portion of the filter accommodating cylinder and the projecting portions to be inserted and fitted into the respective opening portions may be provided in the front end portion of the filter accommodating cylinder and the downstream cylinder. Further, the projecting portions may be provided in the upstream cylinder and in the rear end portion of the filter accommodating cylinder and the opening portions, into which the respective projecting portions are inserted and fitted, may be provided in the front end portion of the filter accommodating cylinder and the downstream cylinder. These constructions may be similarly applied to the other embodiments.

Besides, the first embodiment is explained taking an example where the exhaust gas treatment device 21 is equipped with the particulate matter removing device including the oxidation catalyst 25 for removing particulate matter (PM) contained in an exhaust gas to purify the exhaust gas, the DPF 41, the pressure sensor 48, the temperature sensors 49 and 50, and the like. However, the present invention is not limited to this particular example. For instance, as the exhaust gas treatment device, there may be applied a NOx purifying device including a selective reduction catalyst, a urea injection valve, various types of sensors and the like for purifying nitrogen oxides (NOx) contained in the exhaust gas by using a urea water solution. Further, as the exhaust gas treatment device, there may be applied a combination of the particulate matter removing device and the NOx purifying device. This construction may be similarly applied to the other embodiments.

On the other hand, the first embodiment exemplifies a case where the front side cylinder moving mechanism 27 is provided between the placing leg 26 of the upstream cylinder 22 and the front side mounting plate 16C of the treatment device supporting bracket 16 and the rear side cylinder moving mechanism 34 is provided between the placing leg 33 of the downstream cylinder 30 and the rear side mounting plate 16D of the treatment device supporting bracket 16. However, the present invention is not limited to this particular example. For instance, only the front side cylinder moving mechanism may be provided by forming an elongated hole only to the placing leg of the upstream cylinder and a bolt passage hole instead of the elongated hole may be formed in the placing leg of the downstream cylinder. In addition, in reverse, the rear side cylinder moving mechanism only may be provided. These constructions may be similarly applied to the other embodiments.

The first embodiment exemplifies a case where the filter accommodating cylinder 37 as one purifying part cylinder is mounted between the upstream cylinder 22 and the downstream cylinder 30. However, the present invention is not limited to this particular example. For instance, two or more purifying part cylinders may be mounted between the upstream cylinder and the downstream cylinder.

Furthermore, in each embodiment, a description has been given by citing as an example the case where the exhaust gas treatment device 21 or 61 is installed in the hydraulic excavator 1 equipped with a crawler type lower traveling structure 2. However, the present invention is not limited to this particular example. For instance, a configuration may be provided in which the exhaust gas treatment device may be installed in the hydraulic excavator equipped with a wheel type lower traveling structure consisting of tires and the like. In addition to these, the exhaust gas treatment device may be widely installed extensively in other construction machines such as a lift truck, a dump truck, a hydraulic crane, and the like.

The invention claimed is:

1. An exhaust gas treatment device comprising:
an upstream cylinder disposed on an upstream side of an exhaust gas passage of an engine mounted on a vehicle body;
a downstream cylinder disposed on a downstream side of said upstream cylinder;
a purifying part cylinder disposed between said upstream cylinder and said downstream cylinder by being connected in series with each other and accommodating a treatment member therein for purifying an exhaust gas; and
a pair of circular gaskets disposed respectively between said upstream cylinder and said purifying part cylinder and between said downstream cylinder and said purifying part cylinder;
wherein said upstream cylinder and said purifying part cylinder or said downstream cylinder and said purifying part cylinder each have a respective connecting portion, where the connecting portion of one cylinder includes a flange and the connecting portion of the other cylinder includes a flange and a projecting portion projecting from said flange to be inserted and fitted into said one cylinder,
said exhaust gas treatment device further comprising:
an engaging portion, with which said gasket is engaged, is disposed on said projecting portion of said other cylinder on an outer peripheral surface of said projecting portion;
a support member disposed on said vehicle body for supporting said upstream cylinder and said downstream cylinder;
a plurality of placing legs disposed on said upstream cylinder and said downstream cylinder respectively to be mounted on said support member; and
a plurality of cylinder moving mechanisms, which allow said placing legs to move on said support member in a horizontal direction, respectively disposed between said support member and each of said placing legs of said upstream cylinder or said downstream cylinder for moving said upstream cylinder or said downstream cylinder and said respective placing legs thereof in the horizontal direction at the time of mounting and removing said purifying part cylinder,
wherein said projecting portion of said other cylinder is inserted and fitted to, or is disengaged from, said one cylinder by said cylinder moving mechanisms.

2. The exhaust gas treatment device according to claim 1, wherein said engaging portion is a recessed groove extending in a circumferential direction at an axial intermediate position of said projecting portion, and
an inclined surface portion is disposed in said recessed groove to be positioned at said flange side.

* * * * *